United States Patent [19]

Hunter et al.

[11] 4,175,286

[45] Nov. 20, 1979

[54] BURN-IN TEST SYSTEM FOR ELECTRONIC APPARATUS

[75] Inventors: Arthur C. Hunter, Lubbock County; Lloyd E. Norman, Garland, both of Tex.

[73] Assignee: Texas Instruments Incorporated, Dallas, Tex.

[21] Appl. No.: 870,697

[22] Filed: Jan. 19, 1978

[51] Int. Cl.[2] .......................... G06F 3/12; G06F 11/06

[52] U.S. Cl. .................................... 364/737; 364/900; 354/900

[58] Field of Search ............... 364/740, 737, 200, 900; 235/304, 304.1, 309; 324/73 R, 73 AT

[56] References Cited

U.S. PATENT DOCUMENTS

| | | | |
|---|---|---|---|
| 3,604,906 | 9/1971 | Hunter et al. | 235/309 |
| 3,753,226 | 8/1973 | Schnurmann et al. | 235/302 X |
| 3,839,630 | 10/1974 | Olander, Jr. et al. | 364/706 |
| 3,909,802 | 9/1975 | Cassarino, Jr. et al. | 364/200 |
| 3,921,142 | 11/1975 | Bryant et al. | 364/737 |

*Primary Examiner*—David H. Malzahn
*Attorney, Agent, or Firm*—William K. McCord; James T. Comfort; Melvin Sharp

[57] ABSTRACT

An electronic apparatus having a keyboard and an output device, such as a thermal printer unit. The apparatus, including its printer unit, is burn-in tested by an electronic system built into the apparatus. The system includes a memory, a circuit for storing a preselected or predetermined alphanumeric code in the memory and a circuit for repetitively causing the printer unit to print the contents of the memory. A delay system may be incorporated which causes the apparatus to enter a wait mode between printing operations. The period of time that the system is in the wait mode may be either a fixed duration or of a selected duration. In the embodiment disclosed, the apparatus is an electronic calculator.

18 Claims, 4 Drawing Figures

BURN-IN TEST SYSTEM FOR ELECTRONIC APPARATUS

BACKGROUND OF THE INVENTION

This invention relates to an electronic apparatus responsive to input signals for repetitively actuating an output device for testing the apparatus and the output device. More particularly, this invention relates to a modification to a calculator or microprocessor, in which the calculator or microprocessor is responsive to input signals for repetitively actuating an output device such as a printer when the calculator or microprocessor is placed in a test mode.

Electronic microprocessor or calculator integrated circuits are frequently used with output devices, such as thermal or mechanical printers, visual displays, typewriters and the like. During the manufacturing process for such equipment it is desirable that the output devices, as well as the integrated circuits, be tested to assure proper operation thereof before the equipment is delivered to the ultimate purchaser. Electronic calculators, and especially electronic printing calculators, are preferably tested while still in the manufacturers plant. The testing may include a "burn in" test, that is, a test over a prolonged period of time, because electronic components sometimes fail not immediately, but rather after a short period of operation. Electronic printing calculators utilizing thermal printing units may fail not immediately but rather after several minutes to several hours of operation. Thus, such electronic printing calculators are tested over a prolonged period of time, usually 24 hours or longer.

To conserve the amount the paper tape used this "burn in" test is generally accomplished by intermittently actuating the calculators' printer units rather than by continuously printing during a long period of time. Originally this testing was manually performed by employees of the manufacturer of the calculator who would periodically cause each calculator tested to print out a line of characters. Subsequently, in order to lessen the amount of human labor involved, racks were provided for testing the calculators, the racks being provided with power supplies for the calculators (if required) as well as two or more electrical contact pins for each calculator to be tested. Preferably, the bottom case of each calculator was provided with a connector mating with the contact pins on the rack; the contacts in the calculators' connector were coupled to the calculator's keyboard and the contact pins on the rack were coupled to one or more switches or relays. The connections were arranged such that when the switches or relays were closed (in the proper sequence, if need be), the calculators were caused to print a line of characters (such as a line of the numeral eight). By providing appropriated timing apparatus for periodically closing the switches or relays, the calculators installed in the rack would intermittently perform the desired printing operation. While this equipment overcame inefficiencies involved with manual testing the calculators, it raised other problems, such as (1) the manual labor associated with requiring each calculator tested to be mated with the pins on the test racks, (2) breakage of either the pins or calculator connectors during use of the test rack, (3) the expense of the rack and testing apparatus and (4) the need to either standardize the test connectors or to alter the testing apparatus for a calculator model change.

It is therefore one object of this invention to eliminate the need for such special testing apparatus. It was another object of this invention that the calculators be easily tested without the need either for special connections between the calculator and some testing apparatus or for manual inputting of the line of characters to be printed for such printing operation. It was therefore another object of this invention that a calculator be provided with a self-testing mode of operation.

By eliminating the connections between the test racks and the calculators, the cost of test racks is significantly reduced, as well as the cost of maintenance thereof, the yield of calculators from an assembly line is improved and any need for redesigning the test rack upon changing the design of the calculator is avoided.

The foregoing objects are achieved as is now described. Microprocessor integrated circuits used in calculators and other equipment normally have an instruction word memory for storing a plurality of instruction words which are addressed by the contents of an address register. The instruction words read from the instruction word memory are decoded, such as by an instruction word decoder circuit, and are used to control the operations performed by the calculator in response to depression of keys at the calculator's keyboard. By loading the instruction word memory with appropriate instructions, the calculator may be made to perform many different and useful data handling and printing operations in response to different inputs at the calculator's keyboard. The microprocessor integrated circuit is caused to enter a self-testing program in response to appropriate input signals such as those caused by depression of a preselected sequence of keys at the calculator's keyboard. During the self-testing program, a memory in the microprocessor is loaded with a preselected multi-digit alphanumeric code and the preselected multi-digit alphanumeric code is automatically and repetitively transferred to the calculator's printing unit for printing thereat. Preferably, a timer circuit is also provided for timing period between printing operations, which period may be selectively controlled by an input at the keyboard; thus the timer circuit controls the rate at which the printer unit is actuated by the contents of the memory. Accordingly, the printer unit is repetitively and automatically actuated, the period of time occurring between actuations thereof either being a function of the data entered at the calculator's keyboard in one embodiment or being of a preselected duration in another embodiment.

BRIEF DESCRIPTION OF THE DRAWINGS

Still further objects and advantages of the invention will be apparent from the detailed description and claims when read in conjunction with the accompanying drawings wherein:

DETAILED DESCRIPTION OF AN ILLUSTRATIVE EMBODIMENT

Prior to describing the structure and operation of the invention in connection with the accompanying drawings, it is to be noted that for convenience of explanation, certain embodiments of the invention are described in conjunction with an electronic printing calculator. However, it will be appreciated by those skilled in the art that the invention itself may also be used in conjunction with other electronic apparatus, and may find particular use in applications using microprocessor technology in conjunction with some output device which is preferably repetitively tested during "burn in" testing prior to delivery of the equipment to either commercial or consumer purchasers. We have described our invention in conjunction with an electronic printing calculator inasmuch as such is our preferred mode of employing our invention.

Figure 1:
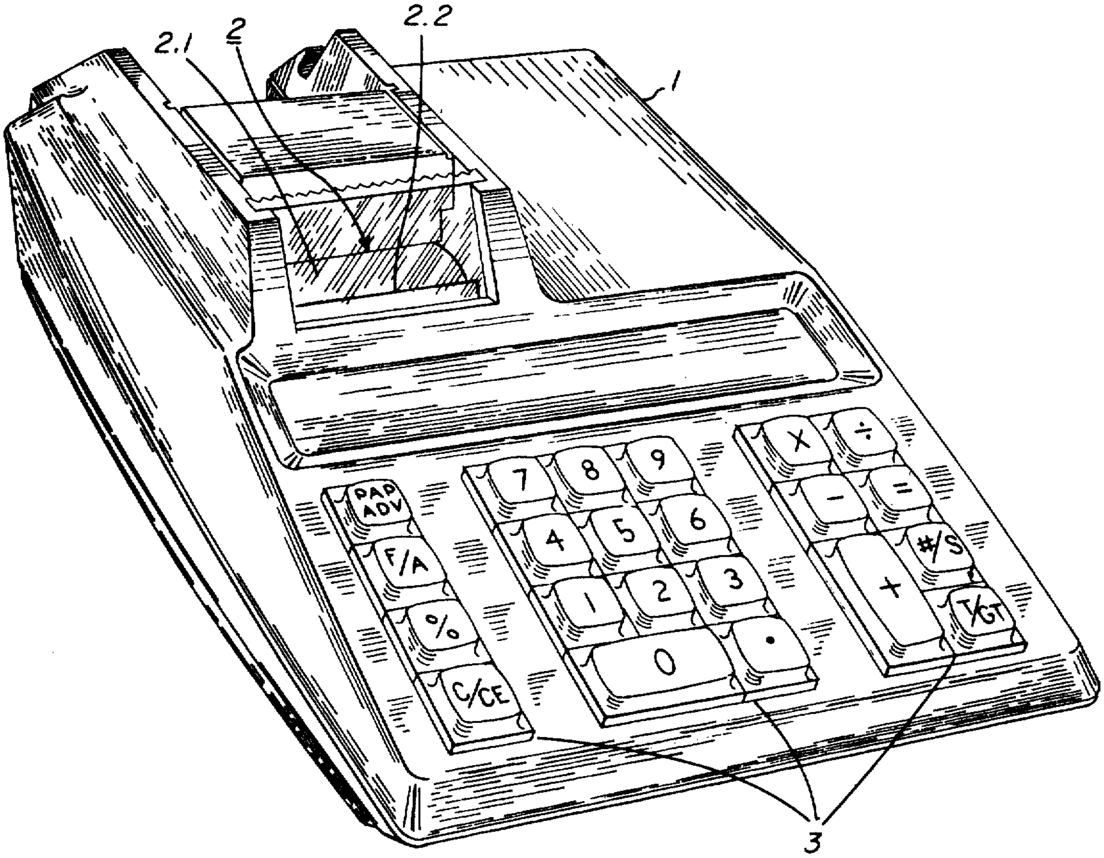
FIG. 1 is a top view of a printing calculator of the type which may embody the present invention.

Referring now to FIG. 1, there is shown a perspective view of a desk model electronic printing calculator of the type which may embody the present invention. The calculator includes a case 1, a printer unit 2 and a keyboard 3 as well as at least one integrated circuit disposed inside case 1. By design choice, of course, the calculator may be a desk model or portable, larger or smaller, operated on alternating current (AC) or battery operated and further may be provided with a visual display, if desired. When practicing the present invention, we prefer to use a non-impact, thermal printer for printer unit 2; however, conventional mechanically impact type printers may be used if desired. Thermal printers include an array of printing mesas which are disposed adjacent to thermally sensitive paper tape. Reference may be made to U.S. patent application Ser. No. 680,835 for a typical thermal printing unit used in electronic printing calculators. The thermal printer usually includes a platten 2.1 and printing head 2.2 upon which the thermal printing mesas are disposed. Between the platten 2.1 and printing head 2.2 is carried the thermally sensitive paper which changes color or darkens in respose to heating of the printing mesas. The mesas increase in temperature in response to an electrical current passing therethrough.

Figure 2:
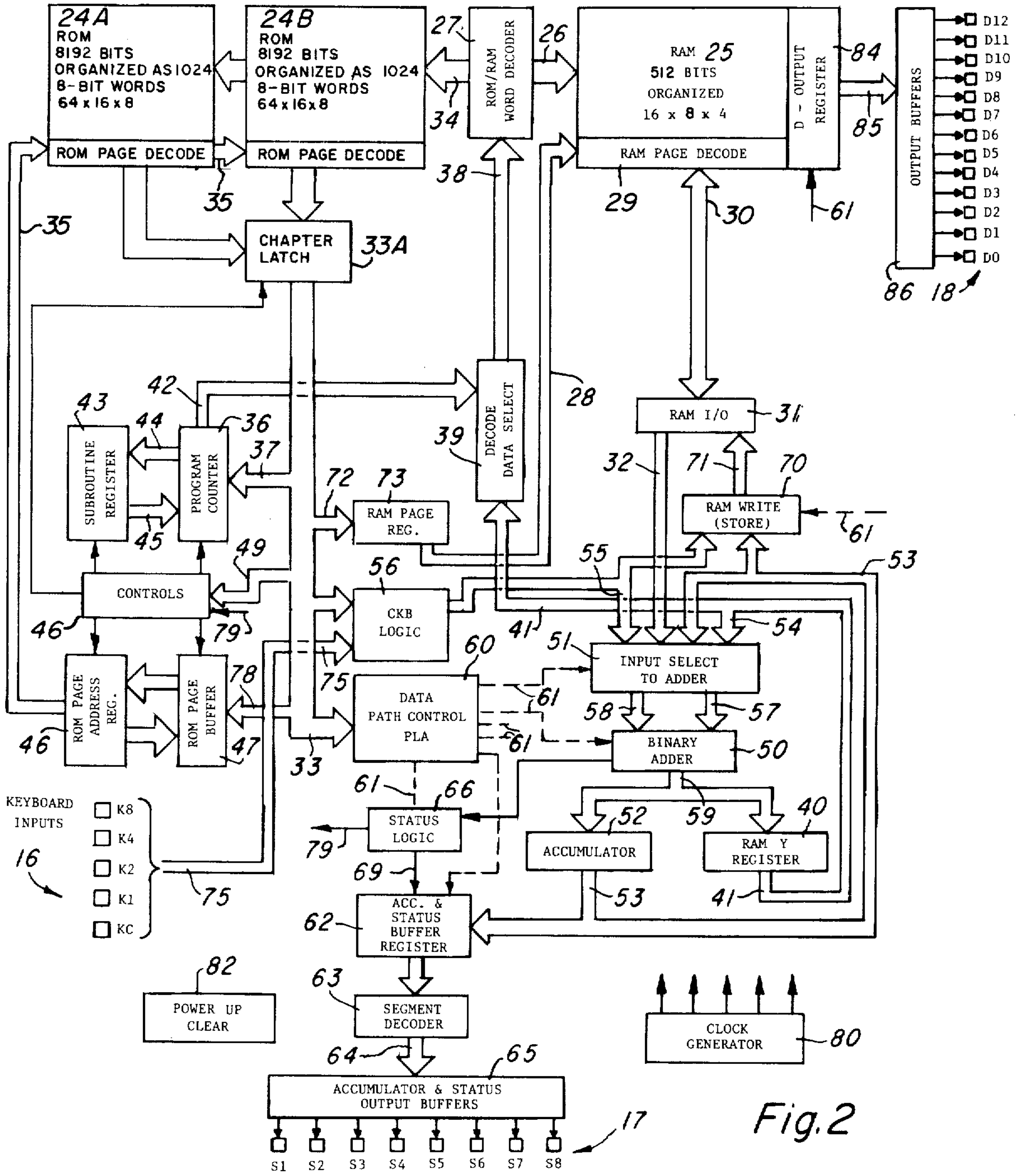
FIG. 2 is a block diagram of a microprocessor which may be implemented with the present invention.

Referring now to FIG. 2, there is shown a block diagram of a microprocessor chip or integrated circuit of the type which may employ the present invention. The microprocessor of FIG. 2 is a digit processor, as opposed to a word oriented processor and uses parallel data paths for transmission of data. It will become evident to those skilled in the art, however, that the present invention may be used with word or serially organized processor or calculator chips, if desired. The digit processor of FIG. 2 includes two Read-Only-Memories (ROMs) **24*a* and 24*b* and a Random Access Memory (RAM) 25 and may be used in calculator applications as described in U.S. Pat. No. 3,988,604. Each ROM stores a plurality of instruction words which are outputted in response to a ROM page address in register 46 and a program counter address in counter 36. The instruction words are outputted from either ROM 24*a* or 24*b* on bus 33 and are provided to various circuits in the microprocessor for controlling the operation thereof in response to the instruction word on bus 33. The instruction words on bus 33 are derived from a particular ROM 24*a* or 24*b* according to the setting of chapter latch 33*a*. Chapter latch 33*a* preferentially enters a zero state when the microprocessor is energized. The state of the chapter latch is changed by controls 46 in response to a branch instruction occurring after a complement chapter latch instruction. RAM 25 contains 256 memory cells which are software organized into four 16 digit registers with four bits per digit. Numerical data entered by the calculator's keyboard 3 (FIG. 1) is stored in RAM 25**, along with intermediate and final results of calculations as well as status information or flags, decimal point position and other working data.

Numerical data and other information is operated on in the system by a binary adder 50 which is a bit parallel adder operating in binary with BCD software correction. The input to adder 50 is determined by an input selector 51 which receives four bit parallel inputs from several sources and selects from these what inputs are applied to the adder. First the memory read or recall lines 32 from RAM 25 provide one of the alternatives. Two registers receive the adder output, these being the "RAM Y" register 40 and an accumulator 52. Each of these has output lines separately connected as inputs 53 and 54 of selector 51. A fourth input 55 receives an output from "CKB" logic 56. The output from the adder 50 is applied to either or both the RAM Y register 40 or the accumulator 52 via lines 59. All of the operations of adder 50 and its input selector 51 etc., are controlled by a data path control PLA 60 which is responsive to the instruction words on bus 33 from ROM 24. The four bit output from the accumulator can be applied via lines 53 to an accumulator output buffer 62 and thus to a segment decoder 63 for output from the system. The segment decoder 63 is a Programmable Logical Array (PLA) and produces up to eight segment outputs on line 64 which are applied to a set of eight output buffers 65. The output arrangement contains a memory in buffer 62 so that an output digit can be held for more than one machine instruction cycle. Output is under control of the data control logic PLA 60 which is responsive to the instruction words on bus 33 from ROM 24. Line 17 from buffer 65 may then be coupled to the thermal printing mesas in thermal printer 2. Of course, if the microprocessor of FIG. 2 is fabricated using MOS integrated circuits then line 17 may be coupled to bipolar drivers since conventional MOS circuits are presently not capable of directly driving conventional semiconductor printing mesas. However, using mesas of the type taught in U.S. Pat. No. 3,982,093, may be directly driven from MOS integrated circuits the need for such bipolar drivers may be eliminated.

Output register 84 is loaded under control of line 61 as addressed by RAM word lines 26. The output from register 84 is connected via lines 85 to a set of output buffers 86. Sixteen outputs are possible, but perhaps only nine to thirteen would be provided as outputs in a typical calculator design. Thus, the outputs on lines 81 may be used to control the various digits of the printer unit such as eight digits for mantissa, two for exponents, two for annotators such as minus signs for mantissa and exponent. For a fuller discussion of a the microprocessor of FIG. 2, the reader is directed to U.S. Pat. No. 3,988,604 which issued Oct. 26, 1976 to Joseph H. Ramond, Jr. and which is assigned to the assignee of this invention. It should be noted that the microprocessor of FIG. 2 differs from the microprocessor of U.S. Pat. No. 3,988,604 in that there is twice as much ROM and ram in FIG. 2. The added Chapter Latch permits the additional ROM area to be addressed and RAM page register is three bits long in lieu of two bits to permit having eight sixteen digit pages in RAM 25. The microprocessor of FIG. 2 is currently available from Texas Instruments Incorporated by the designation TMS1100. U.S. Pat. No. 3,988,604 is hereby incorporated herein by reference.

Figure 3:
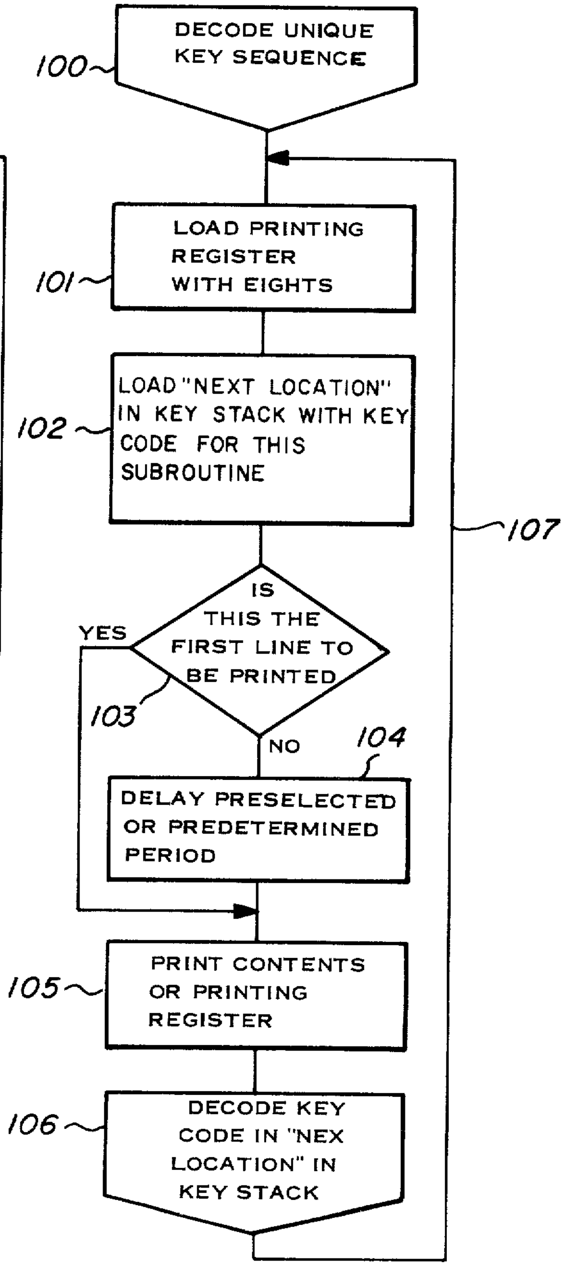
FIG. 3 is a flow chart of operations which may be performed by a microprocessor when implemented with the present invention.

Referring now to FIG. 3, there is shown a flow diagram of operations which may be performed by a microprocessor to practice the current invention. At block 100, the microprocessor decodes a unique sequence of key actuations at keyboard 3. Upon decoding such unique sequence of key actuations, the calculator is caused to enter the loop shown in FIG. 3 and comprising blocks 101-106 and line 107. Until this unique sequence of keys depressions is decoded by the calculator, the calculator operates in a conventional manner (assuming it has not malfunctioned, of course), and thus can add, subtract, divide and multiply numbers inputted at the calculator's keyboard 2.

In the embodiment disclosed, the key sequence which is decoded by the microprocessor before entering the self test burn in mode, comprises the steps of (1) depressing the F/A key, (2) depressing a number key and holding it down while subsequently depressing the paper advance (PAP ADV), F/A, percent (%) and C/CE keys all at once, (3) releasing the number key while still holding down the paper advance, F/A, percent (%) and C/CE keys, (4) depressing the plus (+) key while still holding down the paper advance, F/A, percent and C/CE keys and (5) releasing all keys. It will be appreciated by those familiar with electronic calculators that this key sequence is highly unusual and was selected as a matter of design choice as one which will be very unlikely to occur during the normal use of the calculator, so that the eventual purchaser of the calculator will unlikely cause the calculator to inadvertently enter this mode. It will be readily appreciated that other such sequences of key depressions could be used. Further, it should be appreciated that the microprocessor of FIG. 2 can accomodate the simultaneous depression of several keys; however, not all microprocessor or calculator chips are capable of properly decoding the simultaneous depression of several keys and thus, in that case, with such microprocessor or calculator chips, some unusual sequence of single key depressions would preferably be selected. However when using a microprocessor or calculator chip capable of decoding multiple simultaneous key depressions, we prefer that the unique sequence include such simultaneous depressions inasmuch as such depressions are usually not intentionally made when operating a calculator. This is especially true in the foregoing example which includes the simultaneous depression of five keys.

In the foregoing unique key sequence, there is included the depression of a number key. In this embodiment of our invention, the period of time between the repetitive actuations of the printer or other output device may be selectively controlled; that is, inputting a zero results in minimum delay between actuations of the output device while inputting the number nine results in a delay of several minutes with several steps in between corresponding to the depression of other number keys in this sequence. Of course, those practicing the present invention may desire that the delay between the repeative actuations of the output device be at some fixed, predetermined delay (or no delay) as opposed to being selectable according to the number inputted during the unique key sequence.

At block 101 in flow chart of FIG. 3, the printing or output register, which is located in a predetermined portion of RAM 25, is loaded with a plurality of numerals 8's. Thus, when the calculator is caused to enter its self-exerciser mode (that is, its "burn-in" testing mode) the output device or printer is caused to print the contents of the printing register, which, in this case, causes the printing of a plurality of numeral 8's each time it is actuated. Of course, the printing register may alternatively be loaded with other preselected numerals or with alphabetic character information or with characters entered at keyboard 3, if desired. However, we load the printing register in RAM 25 with a plurality of numeral 8's inasmuch as an eight is a symmetrical character (thereby simplifying the observation of faulty printing) and results in energization of all thermal printing mesas when arranged as a linear array.

At block 102, a key code for the self-exerciser program is loaded into the next location in the key stack memory. The key stack memory is a first-in, first-out type memory which stores a plurality of two digit key codes. Each key at the calculator's keyboard has a unique two digit key code associated therewith and, in addition, the burn-in subroutine program has its own two digit code which is different from that of any of the key codes associated with the keys on the calculator's keyboard. The use of first-in, first-out key stack permits the calculator to remember a series of key depressions occurring faster than the calculator can respond to the key depressions. This is useful in printing calculators where the operator of the calculator may tend to input data via the keyboard when the calculator is in a printing mode for instance.

The code in the next location in the first-in, first-out key stack is then transferred either directly or indirectly to program counter 36 for accessing a subroutine in ROM 24 when the subroutine associated with the previous key code has been completed. When, the code for the burn-in subroutine is subsequently read from the first-in, first-out key stack, then the program will automatically branch to the point between blocks 100 and 101. As will be seen, making use of the first-in, first-out key stack for repetitively calling this subroutine permits the calculator to make convenient use of its normal supervisor or operating system.

At block 103, a test is made of whether or not the first line has been printed. This is preferably done by setting (or resetting) a flag and branching around block 104 only if the first line has not yet been printed in response to decoding the unique key sequence at block 100. During the unusual key sequence of block 100, it is previously indicated that a numeral key may be depressed to indicate the length of time to occur between actuations of the printer. This is accomplished, for instance, at block 104, by loading the numeral depressed during the unique key sequence into the most significant digit location of a counter and then decrementing that counter until it reaches zero. Upon reaching zero, then printing may occur. Of course, if the number inserted is zero then the delay will be zero. Alternatively, of course, the delay may be of a preselected value (including zero) rather than corresponding to some numeral entered during the unique key sequence.

The test made at step 103 is used in conjunction with the delay associated at block 104 because when delays (and especially long delays) are generated at step 104 we find it preferable that the first line of printing occur immediately in response to the decoding of the unique key sequence at step 100 rather than waiting for the calculator to first complete a long delay before performing the first printing operation. We chose to have the first line printed immediately, as opposed to waiting for the delay, so that an operator inserting the unique key sequence at block 100 knows immediately whether or not the sequence has been entered properly.

After block 104, printing at step 105 occurs using the calculator's normal printing routine for printing the contents of the printing register. By branching immediately to the normal printing routine at step 105 we avoid the addition of additional instruction words to the ROM for testing the status of the printing, decoding the contents of the printing register for printing and so forth. Upon completing the line of printing under control of the calculator's normal supervisory or operating system, it then reads out the key code at the "next location" in the key stack at step 106. Of course, at the "next location" is the code for the self-testing routine which was previously inserted in the "next location" at step 102 thus causing a branch back to the point in the program between blocks 100 and 101, the branch or loop being indicated by numeral 107.

It will be appreciated by those skilled in the art that the order of steps of 101–105 may be altered, if desired; however, certain alterations may not always make the best use of the calculators existing operating or supervisory system, should those practicing our invention decide to make use of such operating of supervisory systems. Thus, step 102 could be accomplished either before step 101 or as late as after step 105. Step 105 could be performed before step 104, and which would, in addition, eliminate any need for step 103 inasmuch as the first line would be printed before delay would be generated at step 104.

It should be appreciated that using the self-testing burn-in program described with reference to FIG. 3 results in a desensitization of the microprocessor chip to entries made at the calculator's keyboard inasmuch as the branch made at block 106 based on the contents of the next location in the first-in, first-out key stack because the key code at that location is controlled by block 102 rather than by entries made at keyboard 2. The calculator may be simply returned to its normal condition (i.e. not in the burn-in test mode) by de-energizing and then re-energizing the calculator.

Figure 4:
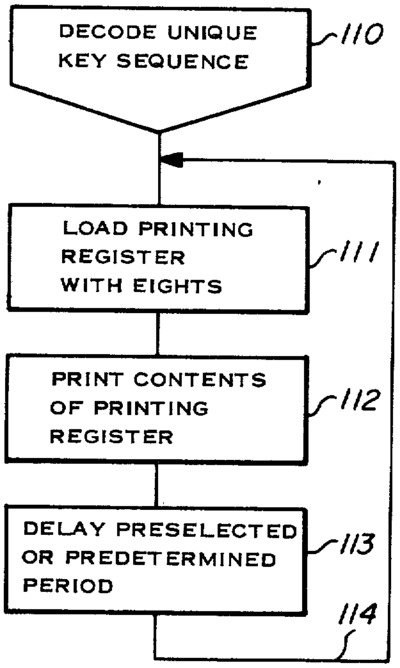
FIG. 4 is a flow chart of operations which may be performed by another microprocessor when implemented with the present invention.

Referring now to FIG. 4, there is shown another embodiment or invention. At step 110 the unique key sequence is decoded much in the same manner as was done at step 100 (FIG. 3). Upon decoding the unique key sequence, the printing register in the calculator is loaded with a desired alphanumeric code, such as a plurality of eights, much in the same manner as was done at step 101 (FIG. 3).

At step 112 the contents of the printing register is printed according to a series of instructions outputted from the ROM. These instructions cause the contents of the printing register to be decoded for energization of the linear array of thermal heaters. These instructions preferably include the instructions for stepping the platten 2.1 as the mesas are energized so that a line of characters is printed. For example, the array of mesas are selectively energized as the thermally sensitive paper is stepped passed the array; in one embodiment, the thermally sensitive paper may be stepped seven times for each line of characters to be printed and a width of five mesas may be used for printing a single character so that a set of alphanumeric characters may be printed within the bounds of a five by seven block of dot producted on the thermally sensitive paper by heating of the mesas.

After completing the printing operation at step 112, the operations at block 113 are accomplished for delaying the next operation for some selected or predetermined period of time. This may be done in much the same manner as the delay was generated at step 104 (FIG. 3). Upon completing the delay at block 113, a branch, indicated by line 114, occurs to block 111 where the instructions for loading the printing register are located. Of course, if during the printing operation at block 112 the contents of the printing register are not destroyed, then the branch after block 113, represented by line 114, may be made directly to the instructions for printing one line, at block 112, in lieu of reloading the data into the printing register at block 111.

In Table I (which comprises Tables I-0-0 through I-0-15 and Tables I-1-1 through I-1-15) is listed the set of instructions which may be stored in the read-only-memories 24A and 24B of the microprocessor described with reference to FIG. 2, which instruction set provides a printing calculator of the type shown in FIG. 1 with the burn-in test mode described with reference to FIG. 3. Referring now to Table I, there are several columns of data which are, reading from left to right: PC (Program Counter), INST (Instruction), BRLN (Branch Line), Line, and Source Statement (which includes name, title and comments). In the microprocessor of FIG. 2, the read-only-memories are addressed with a seven bit address in the program counter, a four bit address in ROM page address register 46 and according to the state of chapter latch 33a. The instructions listed on Table I-0-0 correspond to Chapter 0, in the microprocessor, while the instructions listed in Table I-0-1 are those of Chapter 0 and so forth through the instructions in Table I-0-15 which are stored of Chapter 0 in the microprocessor. Similarly, the instructions listed on Table I-1-0 correspond to Chapter 1, in the microprocessor while the instructions listed in Table I-1-1 are those of Chapter 1 and so forth through the instructions in Table I-1-15 which are stored in Chapter 1 of the read-only-memories in the microprocessor of FIG. 2.

The program counter of the microprocessor of FIG. 2 is preferably comprised of a feedback shift register and therefore counts in a pseudorandom fashion, thus the addresses in the left hand column of Table I, which are expressed as a hexadecimal number, exhibit such pseudorandomness. If the instructions starting at Chapter 0 were read out sequentially from the starting position in program counter (00) then the instruction would be read out in the order shown in Table I. In the "line" column is listed a sequentially increasing decimal number associated with each source statement and its instruction and program counter address. The line number starts at line 12 for reason of convenience not important here. When an instruction requiring either a branch or call is to be performed, the address to which the program counter will jump, the page number to which the page register will jump, if required, and the status of the chapter latch is reflected by the binary coded comprising the instruction or instructions performing the branch or call. For sake of convenience, however, the branch line column indicates the line number in Table I to which the branch or call will be made. The title in the source statement is a mneumonic for the instruction associated therewith. The comments column shows the names which have selected for branch routines, the values of various constant fields in the instruction and other comments made by the person who developed the set of instructions. The name column lists the names given to subroutines called by call or branch instructions.

In Table 2 there is a listing of the various instruction types, their mneumonic names and the functions performed in response to these instructions. The instructions generally correspond to the instruction set listed in U.S. Pat. No. 3,988,604 with modifications to permit three bits as opposed to two bits to be inserted into the RAM page address registers 73 and an instruction to permit the chapter latch 33a to be complimented. Since the instruction set listed in U.S. Pat. No. 3,988,604 is already fully populated, various instructions listed therein have been deleted to make room for the additional instructions required for the chapter latch and the extra bit in the RAM page address register. Of course, some of the decoders coupled to bus 33 in the microprocessor of FIG. 2 and U.S. Pat. No. 3,988,604 need to be modified to properly decode the instructions of Table II. Inasmuch as these decoders are preferably programmable, the decoder should be appropriately programmed at the same time the instruction set is loaded into ROMs 24a and 24b of the microprocessor of FIG. 2.

We have described our invention in connection with certain specific embodiments thereof. It is to be understood that modifications may now suggest itself to those skilled in the art and this is invention is not limited to the specific embodiments disclosed, except as set forth in the appended claims.

| PC | INST | BRLN | LINE | NAME | SOURCE STATEMENT TITLE | COMMENTS |
|---|---|---|---|---|---|---|
| 0000 | 00101101 | | 0012 | NUMB | LDX | C |
| 0001 | 01001011 | | 0013 | | TRCY | 13 |
| 0003 | 00110100 | | 0014 | | RBIT | 0 |
| 0007 | 00101100 | | 0015 | | LDX | B |
| 000F | 00111000 | | 0016 | | TBIT | 0 |
| 001F | 10011110 | 0024 | 0017 | | BRNC | NUMB1 |
| 003F | 00110000 | | 0018 | | SBIT | 0 |
| 003E | 00110110 | | 0019 | | RBIT | 1 |
| 003D | 00011111 | | 0020 | | LDP | 15 |
| 0039 | 11010110 | 1008 | 0021 | | CALL | CLRFGA |
| 0037 | 01000111 | | 0022 | | TRCY | 14 |
| 002F | 01100000 | | 0023 | | CMIY | 0 |
| 001F | 00101000 | | 0024 | NUMB1 | LDX | D |
| 003C | 01000000 | | 0025 | | TRCY | 0 |
| 0039 | 00111001 | | 0026 | | TBIT | 2 |
| 0033 | 10110001 | 0046 | 0027 | | BRNC | L2 |
| 0027 | 00111011 | | 0028 | | TBIT | 3 |
| 000F | 10000101 | 0040 | 0029 | | BRNC | NUMB2 |
| 001D | 00000110 | | 0030 | | A6AA | |
| 003A | 00000100 | | 0031 | | A2AA | |
| 0035 | 00000100 | | 0032 | | A2AA | |
| 002B | 00111010 | | 0033 | | TBIT | 1 |
| 0016 | 10000101 | 0040 | 0034 | | BRNC | NUMB2 |
| 002C | 00101100 | | 0035 | | LDX | B |
| 0019 | 01001011 | | 0036 | | TRCY | 13 |
| 0030 | 01110000 | | 0037 | | ALEC | 0 |
| 0021 | 10011100 | 0044 | 0038 | | BRNC | NUMB3 |
| 0002 | 00000111 | | 0039 | | DCA | |
| 0005 | 00000100 | | 0040 | NUMB2 | A2AA | |
| 000B | 00100100 | | 0041 | | A2AA | |
| 0017 | 00000111 | | 0042 | | DCA | |
| 002F | 10110001 | 0046 | 0043 | | BRNC | L2 |
| 001C | 00110010 | | 0044 | NUMB3 | SBIT | 1 |
| 0038 | 10001100 | 0065 | 0045 | | BRNC | NX2A |
| 0031 | 00101001 | | 0046 | L2 | LDX | A |
| 0023 | 00010110 | | 0047 | | LDP | 6 |
| 0006 | 11101100 | 0420 | 0048 | | CALL | SL1 |
| 000D | 00100001 | | 0049 | L3 | TRMA | |
| 001B | 01000101 | | 0050 | | TRCY | 10 |
| 0036 | 00100110 | | 0051 | | MNEO | |
| 002D | 10100010 | 0060 | 0052 | | BRNC | L5 |
| 001A | 00101100 | | 0053 | | LDX | B |
| 0034 | 01001011 | | 0054 | | TRCY | 13 |
| 0029 | 00111010 | | 0055 | | TBIT | 1 |
| 0012 | 10001000 | 0058 | 0056 | | BRNC | L4 |
| 0024 | 10001100 | 0065 | 0057 | | BRNC | NX2A |
| 0008 | 01111001 | | 0058 | L4 | ALEC | 9 |
| 0011 | 10001001 | 0062 | 0059 | | BRNC | L6 |
| 0022 | 00011111 | | 0060 | L5 | LDP | 15 |
| 0004 | 10000101 | 1014 | 0061 | | BRNC | ERROR1 |
| 0009 | 00101001 | | 0062 | L6 | LDX | A |
| 0013 | 00010110 | | 0063 | | LDP | 6 |
| 0026 | 11001011 | 0430 | 0064 | | CALL | INCDP |
| 000C | 00010111 | | 0065 | NX2A | BL | DISP6 |
| 0019 | 10111110 | 0927 | 0066 | | | |
| 0032 | 00111001 | | 0067 | K1 | SBIT | 2 |

| PC | INST | BRLN | LINE | NAME | SOURCE STATEMENT TITLE | COMMENTS | |
|---|---|---|---|---|---|---|---|
| 0025 | 00101101 | | 0068 | | LDX | C | |
| 0004 | 00110100 | | 0069 | | RBIT | 0 | |
| 0015 | 00011000 | | 0070 | | LDP | 1 | |
| 002A | 10001111 | 0081 | 0071 | | BRNC | NX | |
| 0014 | 00101110 | | 0072 | TRI | LDX | F | |
| 0028 | 00110000 | | 0073 | | SBIT | 0 | |
| 0010 | 00011011 | | 0074 | | LDP | 13 | |
| 0020 | 10011110 | 0867 | 0075 | | BRNC | K15 | |
| | | | 0076 | | PAGE | 1 | |
| 0000 | 00101000 | | 0077 | NX1 | LDX | D | |
| 0001 | 01000100 | | 0078 | | TRCY | 2 | |
| 0003 | 00100110 | | 0079 | | MNEO | | NEW KEY PRESENT |
| 0007 | 10111110 | 0064 | 0080 | | BRNC | SKH | |
| 000F | 00011101 | | 0081 | NX | LDP | 11 | |
| 001F | 00001011 | | 0082 | | COMCP | | |
| 003F | 10111101 | 1792 | 0083 | | BRNC | DEEB | |
| 003E | 00010101 | | 0084 | SKB | LDP | 10 | |
| 0030 | 01001111 | | 0085 | | TRCY | 15 | |
| 003B | 11111100 | 0672 | 0086 | | CALL | SR1 | |
| 0037 | 00010101 | | 0087 | | LDP | 10 | |
| 002F | 01001111 | | 0088 | | TRCY | 15 | |
| 001E | 11111100 | 0672 | 0089 | | CALL | SR1 | |
| 003C | 01001000 | | 0090 | KA | TRCY | 1 | |
| 0039 | 00100001 | | 0091 | | TRMA | | |
| 0033 | 00010100 | | 0092 | | LDP | 2 | |
| 0027 | 01111100 | | 0093 | | ALEC | 3 | |
| 000F | 10011000 | 0166 | 0094 | | BRNC | KA2 | |
| 0010 | 10000000 | 0142 | 0095 | | BRNC | KA1 | RET |
| 003A | 00101110 | | 0096 | ST2 | LDX | F | |
| 0035 | 01001111 | | 0097 | | TRCY | 15 | |
| 002B | 00111000 | | 0098 | | TBIT | 0 | |
| 0016 | 10010111 | 0107 | 0099 | | BRNC | ST6 | |
| 002C | 01111001 | | 0100 | ST5 | ALEC | 9 | |
| 0018 | 10100001 | 0103 | 0101 | | BRNC | ST5A | |
| 0030 | 10000110 | 0113 | 0102 | | BRNC | ST7A | RET |
| 0021 | 00010100 | | 0103 | ST5A | CALLL | FROFF | |
| 0002 | 11011100 | 0174 | 0104 | | | | |
| 0005 | 00011001 | | 0105 | | BL | ST3 | RET |
| 0008 | 10001001 | 0644 | 0106 | | | | |
| 0017 | 00111011 | | 0107 | ST6 | TBIT | 3 | |
| 002F | 10111000 | 0110 | 0108 | | BRNC | ST7 | |
| 001C | 10101100 | 0100 | 0109 | | BRNC | ST5 | RET |
| 0038 | 00110010 | | 0110 | ST7 | SBIT | 1 | FIXED MODE |
| 0031 | 01000111 | | 0111 | | TRCY | 14 | |
| 0023 | 00000011 | | 0112 | | STA | | |
| 0006 | 00010100 | | 0113 | ST7A | CALLL | RESET | |
| 000D | 11001011 | 0171 | 0114 | | | | |
| 001B | 00101001 | | 0115 | | LDX | A | |
| 0036 | 00011111 | | 0116 | | CALLL | CLRAM | |
| 002D | 11011000 | 1010 | 0117 | | | | |
| 001A | 00011010 | | 0118 | | BL | AUTOTEST | RET |
| 0034 | 10010010 | 0380 | 0119 | | | | |
| 0029 | 00011111 | | 0120 | CKM1 | LDP | 15 | |
| 0012 | 11010110 | 1008 | 0121 | | CALL | CLREGA | |
| 0024 | 00101100 | | 0122 | | LDX | B | |
| 0008 | 00010111 | | 0123 | | LDP | 14 | |
| 0011 | 00111000 | | 0124 | | TBIT | 0 | |
| 0022 | 10111111 | 0926 | 0125 | | BRNC | K2 | |
| 0004 | 00101101 | | 0126 | | LDX | C | |
| 0009 | 00011111 | | 0127 | | LDP | 15 | |
| 0013 | 11011000 | 1010 | 0128 | | CALL | CLRAM | |
| 0026 | 00101110 | | 0129 | | LDX | F | |
| 000C | 00110010 | | 0130 | | SBIT | 1 | |
| 0019 | 00010011 | | 0131 | CMC | LDP | 12 | |
| 0032 | 11110011 | 0805 | 0132 | | CALL | AREGE | |
| 0025 | 01100000 | | 0133 | | CMIY | 0 | |
| 000A | 01101011 | | 0134 | | CMIY | 13 | |
| 0015 | 01101001 | | 0135 | | CMIY | 9 | |
| 002A | 01100111 | | 0136 | K6 | CMIY | 14 | |
| 0014 | 01010011 | | 0137 | | YNEC | 12 | |
| 0028 | 10101010 | 0136 | 0138 | | BRNC | K6 | |
| 0010 | 00010101 | | 0139 | | LDP | 10 | |
| 0020 | 10001101 | 0697 | 0140 | | BRNC | SETUP | |
| | | | 0141 | | PAGE | 2 | |

| PC | INST | BRLN | LINE | SOURCE STATEMENT NAME | TITLE | COMMENTS | |
|---|---|---|---|---|---|---|---|
| 0000 | 01000000 | | 0142 | KA1 | TRCY | 0 | |
| 0001 | 01111110 | | 0143 | | ALEC | 6 | |
| 0003 | 10010110 | 0164 | 0144 | | BRNC | NUMBJ | |
| 0007 | 01111110 | | 0145 | | ALEC | 7 | |
| 000F | 10101111 | 0153 | 0146 | | BRNC | KA4 | |
| 001F | 00111011 | | 0147 | KA5 | TBIT | 3 | |
| 003F | 10001011 | 0171 | 0148 | | BRNC | RESET | X/ |
| 003E | 00111001 | | 0149 | | TBIT | 2 | |
| 003D | 10001011 | 0171 | 0150 | | BRNC | RESET | * |
| 003B | 00011011 | | 0151 | KA6 | BL | S,T | BET |
| 0037 | 10000000 | 0855 | 0152 | | | | |
| 002F | 00111000 | | 0153 | KA4 | TBIT | 0 | AUTOTEST |
| 001E | 10111011 | 0151 | 0154 | | BRNC | KA6 | |
| 003C | 00111011 | | 0155 | | TBIT | 3 | |
| 0039 | 10011111 | 0147 | 0156 | | BRNC | KA5 | |
| 0033 | 00101101 | | 0157 | | LDX | C | |
| 0027 | 01001011 | | 0158 | | TRCY | 13 | |
| 000E | 00100001 | | 0159 | | TRMA | | |
| 001D | 11001011 | 0171 | 0160 | | CALL | RESET | |
| 003A | 00000011 | | 0161 | | STA | | |
| 0035 | 00011001 | | 0162 | | BL | K7B | BET |
| 002B | 10100111 | 0610 | 0163 | | | | |
| 0016 | 00010000 | | 0164 | NUMBJ | BL | NUMB | BET |
| 002C | 10000000 | 0012 | 0165 | | | | |
| 0018 | 01000000 | | 0166 | KA2 | TRCY | 0 | |
| 0030 | 00111011 | | 0167 | | TBIT | 3 | |
| 0021 | 10000100 | 0191 | 0168 | | BRNC | ONEJ | |
| 0002 | 00111001 | | 0169 | | TBIT | 2 | |
| 0005 | 10100110 | 0194 | 0170 | | BRNC | KA3 | |
| 000B | 00101010 | | 0171 | RESET | LDX | F | |
| 0017 | 01001011 | | 0172 | | TRCY | 13 | |
| 002F | 00110100 | | 0173 | | RBIT | 0 | GT |
| 001C | 00101110 | | 0174 | FSOFF | LDX | F | |
| 0038 | 01001111 | | 0175 | | TRCY | 15 | |
| 0031 | 00110100 | | 0176 | | RBIT | 0 | FIX SETUP |
| 0023 | 00101101 | | 0177 | XPOFF | LDX | C | |
| 0006 | 01001011 | | 0178 | | TRCY | 13 | |
| 000D | 00110100 | | 0179 | | RBIT | 0 | X% |
| 001B | 00001111 | | 0180 | | RETN | | |
| 0036 | 00101000 | | 0181 | | LDX | 0 | |
| 002D | 01000000 | | 0182 | | TRCY | 0 | |
| 001A | 00011000 | | 0183 | | LDP | 1 | |
| 0034 | 00111000 | | 0184 | | TBIT | 0 | |
| 0029 | 10101001 | 0120 | 0185 | | BRNC | CKM1 | |
| 0012 | 00011111 | | 0186 | | LDP | 15 | |
| 0024 | 00001011 | | 0187 | | COMCP | | |
| 0008 | 00111011 | | 0188 | | TBIT | 3 | |
| 0011 | 10000000 | 2007 | 0189 | | BRNC | X/ | |
| 0022 | 10010110 | 2029 | 0190 | | BRNC | P* | BET |
| 0004 | 00001011 | | 0191 | ONEJ | COMCP | | |
| 0009 | 00010001 | | 0192 | | BL | ONEDWN | BET |
| 0013 | 10011101 | 1578 | 0193 | | | | |
| 0026 | 00101110 | | 0194 | KA3 | LDX | F | |
| 000C | 01000111 | | 0195 | | TRCY | 14 | |
| 0019 | 01100100 | | 0196 | | CMIY | 2 | |
| 0032 | 00100001 | | 0197 | TOGL | TRMA | | |
| 0025 | 00000110 | | 0198 | | A6AA | | |
| 000A | 00000100 | | 0199 | | A2AA | | |
| 0015 | 00000011 | | 0200 | | STA | | |
| 002A | 00001111 | | 0201 | | RETN | | |
| 0014 | 00110110 | | 0202 | | RBIT | 1 | FIXED MODE OFF |
| 0028 | 00110000 | | 0203 | | SBIT | 0 | FIX SETUP |
| 0010 | 00011000 | | 0204 | | BL | NX | BET |
| 0020 | 10001111 | 0081 | 0205 | | | | |
| | | | 0206 | | PAGE | 3 | |
| 0000 | 01111000 | | 0207 | STARTUP | CMIY | 1 | |
| 0001 | 00001011 | | 0208 | | COMCP | | |
| 0003 | 10010001 | | 0209 | | BL | CRUNCH | BET |
| 0007 | 10000000 | 1560 | 0210 | | | | |
| 000F | 00010111 | | 0211 | A/ | LDP | 14 | |
| 001F | 11110101 | 0940 | 0212 | | CALL | SUB | |
| 003F | 01110000 | | 0213 | | ALEC | 0 | |
| 003E | 10111011 | 0216 | 0214 | | BRNC | A25 | |
| 003D | 10011000 | 0231 | 0215 | | BRNC | A26 | BET |

| PC | INST | BRLN | LINE | SOURCE STATEMENT NAME | TITLE | COMMENTS | |
|---|---|---|---|---|---|---|---|
| 0034 | 00010111 | | 0216 | A25 | LDP | 14 | |
| 0037 | 11110101 | 0940 | 0217 | | CALL | SUH | |
| 002F | 00101001 | | 0218 | | LDX | A | |
| 001F | 00010110 | | 0219 | | LDP | 6 | |
| 003C | 11001011 | 0430 | 0220 | | CALL | INCDP | |
| 0039 | 00101100 | | 0221 | A30 | LDX | B | |
| 0033 | 00010110 | | 0222 | | LDP | 6 | |
| 0027 | 11010110 | 0423 | 0223 | | CALL | SL | |
| 000E | 00011101 | | 0224 | | LDP | 11 | |
| 001D | 11000000 | 0725 | 0225 | | CALL | SCAN | |
| 003A | 00001011 | | 0226 | | COMCP | | |
| 0035 | 00010111 | | 0227 | A27 | LDP | 14 | |
| 002B | 11110101 | 0940 | 0228 | | CALL | SUH | |
| 0016 | 01110000 | | 0229 | A26A | ALEC | 0 | |
| 002C | 10011100 | 0239 | 0230 | | BRNC | A28 | |
| 0018 | 00101001 | | 0231 | A26 | LDX | A | |
| 0030 | 01000000 | | 0232 | | TRCY | 0 | |
| 0021 | 00000010 | | 0233 | | INMA | | |
| 0002 | 00000011 | | 0234 | | STA | | |
| 0005 | 01111001 | | 0235 | | ALEC | 9 | |
| 000B | 10010011 | 0258 | 0236 | | BRNC | A27A | |
| 0017 | 00011111 | | 0237 | | LDP | 15 | |
| 002F | 10010001 | 1033 | 0238 | | BRNC | ERROR2 | |
| 001C | 00010111 | | 0239 | A28 | LDP | 14 | |
| 0038 | 11110101 | 0940 | 0240 | | CALL | SUB | |
| 0031 | 01001011 | | 0241 | | TRCY | 13 | |
| 0023 | 00101001 | | 0242 | | LDX | A | |
| 0006 | 00000010 | | 0243 | | INMA | | |
| 000D | 01110101 | | 0244 | | ALEC | 10 | |
| 001B | 10010001 | 0254 | 0245 | | BRNC | A29 | |
| 0036 | 00101000 | | 0246 | ANS1 | LDX | D | |
| 002D | 01001000 | | 0247 | | TRCY | 1 | |
| 001A | 00100001 | | 0248 | | TRMA | | |
| 0034 | 00101001 | | 0249 | | LDX | A | |
| 0029 | 01001011 | | 0250 | | TRCY | 13 | |
| 0012 | 01100000 | | 0251 | | CMIY | 0 | |
| 0024 | 00011001 | | 0252 | | LDP | 8 | |
| 0008 | 10011000 | 0553 | 0253 | | BRNC | ANS2 | |
| 0011 | 00000011 | | 0254 | A29 | STA | | |
| 0022 | 00010110 | | 0255 | | LDP | 6 | |
| 0004 | 11010110 | 0423 | 0256 | | CALL | SL | |
| 0009 | 10111001 | 0221 | 0257 | | BRNC | A30 | RET |
| 0013 | 00010111 | | 0258 | A27A | LDP | 14 | |
| 0026 | 11011010 | 0961 | 0259 | | CALL | ACBR | |
| 000C | 10010110 | 0229 | 0260 | | BRNC | A26A | RET |
| 0019 | 00101101 | | 0261 | BCREG | LDX | C | |
| 0032 | 01000000 | | 0262 | EXR | TRCY | 0 | |
| 0025 | 00100001 | | 0263 | NXD1 | TRMA | | |
| 000A | 00001001 | | 0264 | | COMX | | |
| 0015 | 00111110 | | 0265 | | EXMA | | |
| 002A | 00001001 | | 0266 | | COMX | | |
| 0014 | 00100000 | | 0267 | | STIN | | |
| 0028 | 01011011 | | 0268 | | YNEC | 13 | |
| 0010 | 10100101 | 0263 | 0269 | | BRNC | NXD1 | |
| 0020 | 00001111 | | 0270 | | RETN | | |
| | | | 0271 | | PAGE | 4 | |
| 0000 | 00010110 | | 0272 | AX | LDP | 6 | |
| 0001 | 11010110 | 0423 | 0273 | | CALL | SI | |
| 0003 | 00010001 | | 0274 | | LDP | 8 | |
| 0007 | 11011001 | 0583 | 0275 | | CALL | ABREG | |
| 000F | 01001101 | | 0276 | | TRCY | 11 | |
| 001F | 00111111 | | 0277 | | CLA | | |
| 003F | 00111110 | | 0278 | | EXMA | | |
| 003E | 01001111 | | 0279 | | TRCY | 15 | |
| 003D | 00000011 | | 0280 | A31A | STA | | |
| 003B | 00101001 | | 0281 | A31 | LDX | A | |
| 0037 | 01000000 | | 0282 | | TRCY | 0 | |
| 002F | 00000000 | | 0283 | | DCMA | | |
| 001F | 10011011 | 0310 | 0284 | | BRNC | A32 | |
| 003C | 01001011 | | 0285 | | TRCY | 13 | |
| 0039 | 00000010 | | 0286 | | INMA | | |
| 0033 | 01111001 | | 0287 | | ALEC | 9 | |
| 0027 | 10010010 | 0316 | 0288 | | BRNC | A33 | |
| 000F | 01001111 | | 0289 | | TRCY | 15 | |
| 001D | 00101100 | | 0290 | | LDX | B | |

| PC | INST | BRLN | LINE | NAME | SOURCE STATEMENT TITLE | | COMMENTS |
|---|---|---|---|---|---|---|---|
| 003A | 00100001 | | 0291 | | TRMA | | |
| 0035 | 01001101 | | 0292 | A330 | TRCY | 11 | |
| 002B | 00100110 | | 0293 | | MNEO | | |
| 0016 | 10100011 | 0307 | 0294 | | BRNC | A33A | |
| 002C | 00000011 | | 0295 | | STA | | |
| 0018 | 00010110 | | 0296 | | LDP | 6 | |
| 0030 | 11001011 | 0430 | 0297 | | CALL | INCDP | |
| 0021 | 00101101 | | 0298 | A33B | LDX | C | |
| 0002 | 00010101 | | 0299 | | LDP | 10 | |
| 0005 | 11011110 | 0671 | 0300 | | CALL | SR | |
| 000B | 00010001 | | 0301 | | LDP | 8 | |
| 0017 | 11011001 | 0583 | 0302 | | CALL | ABREG | |
| 002E | 00011001 | | 0303 | | LDP | 9 | |
| 001C | 11110100 | 0636 | 0304 | | CALL | AREGB | |
| 0038 | 00011100 | | 0305 | | LDP | 3 | |
| 0031 | 10110110 | 0246 | 0306 | | BRNC | ANS1 | |
| 0023 | 00010101 | | 0307 | A33A | LDP | 10 | |
| 0006 | 11111001 | 0673 | 0308 | | CALL | A49 | |
| 000D | 10100001 | 0298 | 0309 | | BRNC | A33B | BET |
| 001B | 00000011 | | 0310 | A32 | STA | | |
| 0036 | 00010111 | | 0311 | | LDP | 14 | |
| 002D | 11011010 | 0961 | 0312 | | CALL | ACBB | |
| 001A | 00100111 | | 0313 | | SMAA | | |
| 0034 | 00000011 | | 0314 | | STA | | |
| 0029 | 10111011 | 0281 | 0315 | | BRNC | A31 | BET |
| 0012 | 00000011 | | 0316 | A33 | STA | | |
| 0024 | 00010101 | | 0317 | | LDP | 10 | |
| 0006 | 11011110 | 0671 | 0318 | | CALL | SR | |
| 0011 | 00011101 | | 0319 | | LDP | 11 | |
| 0022 | 11000000 | 0725 | 0320 | | CALL | SCAN | |
| 0004 | 00001011 | | 0321 | | COMCP | | |
| 0009 | 00101100 | | 0322 | | LDX | B | |
| 0013 | 01001101 | | 0323 | | TRCY | 11 | |
| 0026 | 00010101 | | 0324 | | LDP | 10 | |
| 000C | 11111100 | 0672 | 0325 | | CALL | SR1 | |
| 0019 | 10111011 | 0281 | 0326 | | BRNC | A31 | BET |
| 0032 | 01100000 | | 0327 | DISP | CMIY | 0 | |
| 0025 | 00101100 | | 0328 | DISP1 | LDX | B | |
| 000A | 01001011 | | 0329 | | TRCY | 13 | |
| 0015 | 01100000 | | 0330 | | CMIY | 0 | |
| 002A | 00101110 | | 0331 | | LDX | F | |
| 0014 | 01001011 | | 0332 | | TRCY | 13 | |
| 0028 | 00011111 | | 0333 | | BL | CKERR | |
| 0010 | 10001001 | 1036 | 0334 | | | | |
| | | | 0335 | | PAGE | 5 | |
| 0000 | 00001001 | | 0336 | C20 | COMY | | |
| 0001 | 00001011 | | 0337 | | COMCP | | |
| 0003 | 00011000 | | 0338 | | LDP | 1 | |
| 0007 | 11000000 | 1112 | 0339 | | CALL | SHONE | |
| 000F | 00010101 | | 0340 | | LDP | 10 | |
| 001F | 11000000 | 1689 | 0341 | | CALL | DECDP1 | |
| 003F | 00001011 | | 0342 | | COMCP | | |
| 003E | 01000011 | | 0343 | CD | TRCY | 12 | |
| 003D | 00101011 | | 0344 | | LDX | H | |
| 003B | 00111000 | | 0345 | | TBIT | 0 | |
| 0037 | 10110101 | 0356 | 0346 | | BRNC | C15S | |
| 002F | 00101010 | | 0347 | | LDX | E | |
| 001E | 00111000 | | 0348 | | TBIT | 0 | |
| 003C | 10111000 | 0369 | 0349 | | BRNC | C17 | |
| 0039 | 01001101 | | 0350 | C16 | TRCY | 11 | |
| 0033 | 00100001 | | 0351 | | TRMA | | |
| 0027 | 00101011 | | 0352 | | LDX | H | |
| 000E | 00100111 | | 0353 | | SMAA | | |
| 001D | 10101110 | 0367 | 0354 | | BRNC | C18 | |
| 003A | 10101100 | 0359 | 0355 | | BRNC | CD2 | BET |
| 0035 | 00101010 | | 0356 | C15S | LDX | E | |
| 002B | 00111000 | | 0357 | | TBIT | 0 | |
| 0016 | 10111001 | 0350 | 0358 | | BRNC | C16 | |
| 002C | 01000101 | | 0359 | CD2 | TRCY | 10 | |
| 0018 | 00100110 | | 0360 | | MNEO | | |
| 0030 | 10000000 | 0336 | 0361 | | BRNC | C20 | |
| 0021 | 00010110 | | 0362 | LONG | LDP | 6 | |
| 0002 | 11001011 | 0430 | 0363 | | CALL | INCDP | |
| 0005 | 00010110 | | 0364 | | LDP | 6 | |
| 0008 | 11010110 | 0423 | 0365 | | CALL | SI | |

| PC | INST | BRLN | LINE | SOURCE STATEMENT NAME | TITLE | COMMENTS | |
|---|---|---|---|---|---|---|---|
| 0017 | 10111110 | 0343 | 0366 | | BRNC | CD | |
| 002F | 01110000 | | 0367 | C18 | ALEC | 0 | |
| 001C | 10100011 | 0371 | 0368 | | BRNC | C19 | |
| 0038 | 00001001 | | 0369 | C17 | COMX | | |
| 0031 | 10101100 | 0359 | 0370 | | BRNC | CD2 | |
| 0023 | 01001011 | | 0371 | C19 | TRCY | 13 | |
| 0006 | 00010101 | | 0372 | | LDP | 10 | |
| 000D | 00101100 | | 0373 | | LDX | B | |
| 001B | 00111001 | | 0374 | | TBIT | 2 | |
| 0036 | 10111011 | 0668 | 0375 | | BRNC | ERRORC | |
| 002D | 00110011 | | 0376 | | SBIT | 3 | |
| 001A | 00101011 | | 0377 | | LDX | H | |
| 0034 | 00010111 | | 0378 | | LDP | 14 | |
| 0029 | 10000000 | 0920 | 0379 | | BRNC | D+ | |
| 0012 | 00101000 | | 0380 | AUTOTEST | LDX | D | |
| 0024 | 01000000 | | 0381 | | TRCY | 0 | |
| 0008 | 00100001 | | 0382 | | TAMA | | |
| 0011 | 00011011 | | 0383 | | LDP | 13 | |
| 0022 | 01110111 | | 0384 | | ALEC | 14 | |
| 0004 | 10011110 | 0867 | 0385 | | BRNC | K15 | |
| 0009 | 01000100 | | 0386 | | TRCY | 2 | |
| 0013 | 01101111 | | 0387 | | CMIY | 15 | |
| 0026 | 01101110 | | 0388 | | CMIY | 7 | |
| 000C | 00101010 | | 0389 | | LDX | E | |
| 0019 | 01000000 | | 0390 | | TRCY | 0 | |
| 0032 | 00111110 | | 0391 | | EXMA | | |
| 0025 | 01001011 | | 0392 | | TRCY | 13 | |
| 000A | 00101001 | | 0393 | | LDX | A | |
| 0015 | 00010101 | | 0394 | | LDP | 10 | |
| 002A | 01110111 | | 0395 | | ALEC | 14 | |
| 0014 | 10011001 | 0714 | 0396 | | BRNC | FILLER | |
| 0028 | 01000111 | | 0397 | | TRCY | 14 | |
| 0010 | 00101110 | | 0398 | | LDX | F | |
| 0020 | 10101010 | 0719 | 0399 | | BRNC | DELAY | BET |
| | | | 0400 | | PAGE | 6 | |
| 0000 | 00011001 | | 0401 | RP | LDP | 9 | |
| 0001 | 11110100 | 0636 | 0402 | | CALL | AREGB | |
| 0003 | 00011111 | | 0403 | | LDP | 15 | |
| 0007 | 11010110 | 1008 | 0404 | | CALL | CLREGA | |
| 000F | 00101100 | | 0405 | | LDX | 8 | |
| 001F | 01001001 | | 0406 | PRE | TRCY | 9 | |
| 003F | 00100110 | | 0407 | ABA | MNEO | | |
| 003E | 10111010 | 0420 | 0408 | | BRNC | A9 | |
| 003D | 00111100 | | 0409 | | DCY | | |
| 003B | 10111111 | 0407 | 0410 | | BRNC | ABA | |
| 0037 | 01001101 | | 0411 | | TRCY | 11 | |
| 002F | 01100101 | | 0412 | | CMIY | 10 | |
| 001E | 00110100 | | 0413 | | RBIT | 0 | |
| 003C | 00101101 | | 0414 | A10 | LDX | C | |
| 0039 | 01000111 | | 0415 | | TRCY | 14 | |
| 0033 | 00111011 | | 0416 | | TBIT | 3 | |
| 0027 | 10101101 | 0441 | 0417 | | BRNC | RP1 | |
| 000E | 00110011 | | 0418 | | SBIT | 3 | |
| 0010 | 10011111 | 0406 | 0419 | | BRNC | PRE | BET |
| 003A | 01001001 | | 0420 | A9 | TRCY | 9 | |
| 0035 | 00100110 | | 0421 | | MNEO | | |
| 002B | 10111100 | 0414 | 0422 | | BRNC | A10 | |
| 0016 | 00111111 | | 0423 | SL | CLA | | |
| 002C | 01000000 | | 0424 | SL1 | TRCY | 0 | |
| 0018 | 00111110 | | 0425 | A11 | EXMA | | |
| 0030 | 00000101 | | 0426 | | INY | | |
| 0021 | 01011101 | | 0427 | SL2 | YNEC | 11 | |
| 0002 | 10011000 | 0425 | 0428 | | BRNC | A11 | |
| 0005 | 00001111 | | 0429 | | RETN | | |
| 000B | 01001101 | | 0430 | INCOP | TRCY | 11 | |
| 0017 | 00000010 | | 0431 | | INMA | | |
| 002E | 10001101 | 0438 | 0432 | | BRNC | A12 | |
| 001C | 01001101 | | 0433 | A13 | TRCY | 11 | |
| 0038 | 00000011 | | 0434 | | STA | | |
| 0031 | 00111111 | | 0435 | | CLA | | |
| 0023 | 00001111 | | 0436 | | RETN | | |
| 0006 | 10111010 | 0420 | 0437 | | BRNC | A9 | BET |
| 000D | 01000011 | | 0438 | A12 | TRCY | 12 | |
| 001B | 00110000 | | 0439 | | SBIT | 0 | |
| 0036 | 10011100 | 0433 | 0440 | | BRNC | A13 | BET |

| PC | INST | BRLN | LINE | NAME | SOURCE STATEMENT TITLE | COMMENTS | |
|---|---|---|---|---|---|---|---|
| 0020 | 00110111 | | 0441 | RP1 | RBIT | 3 | |
| 001A | 01001011 | | 0442 | | TRCY | 13 | |
| 0034 | 00011100 | | 0443 | | LDP | 3 | |
| 0029 | 00111010 | | 0444 | | TBIT | 1 | |
| 0012 | 11011001 | 0261 | 0445 | | CALL | BCREG | |
| 0024 | 00010110 | | 0446 | | LDP | 6 | |
| 0008 | 01001011 | | 0447 | | TRCY | 13 | |
| 0011 | 00100010 | | 0448 | | TRMY | | |
| 0022 | 01010100 | | 0449 | | YNEC | 2 | |
| 0004 | 11100110 | 0453 | 0450 | | BRNC | A14 | |
| 0009 | 00011100 | | 0451 | | LDP | 3 | |
| 0013 | 11011001 | 0261 | 0452 | | CALL | BCREG | |
| 0026 | 00101101 | | 0453 | A14 | LDX | C | |
| 000C | 01000011 | | 0454 | | TRCY | 12 | |
| 0019 | 00100001 | | 0455 | | TRMA | | |
| 0032 | 00101100 | | 0456 | | LDX | B | |
| 0025 | 00100101 | | 0457 | | AMAA | | |
| 000A | 00101001 | | 0458 | | LDX | A | |
| 0015 | 00110111 | | 0459 | | RBIT | 3 | |
| 002A | 01111110 | | 0460 | | ALEC | 7 | |
| 0014 | 10010000 | 0463 | 0461 | | BRNC | A15 | |
| 0028 | 00110011 | | 0462 | | SBIT | 3 | |
| 0010 | 00011110 | | 0463 | A15 | LDP | 7 | |
| 0020 | 10000000 | 0466 | 0464 | | BRNC | DPR | RET |
| | | | 0465 | | PAGE | 7 | |
| 0000 | 00101000 | | 0466 | DPR | LDX | D | |
| 0001 | 01000000 | | 0467 | | TRCY | 0 | |
| 0003 | 00111010 | | 0468 | | TBIT | 1 | |
| 0007 | 10101110 | 0497 | 0469 | | BRNC | A16 | |
| 000F | 01000110 | | 0470 | | TRCY | 6 | |
| 001F | 00100011 | | 0471 | A17 | TRYA | | |
| 003F | 01001011 | | 0472 | | TRCY | 13 | |
| 003E | 00101101 | | 0473 | | LDX | C | |
| 003D | 00111010 | | 0474 | | TBIT | 1 | |
| 003B | 10011110 | 0478 | 0475 | | BRNC | A17A | |
| 0037 | 00000100 | | 0476 | | A2AA | | |
| 002F | 00000111 | | 0477 | | DCA | | |
| 001E | 01001101 | | 0478 | A17A | TRCY | 11 | |
| 003C | 00100101 | | 0479 | | AMAA | | |
| 0039 | 10111000 | 0499 | 0480 | | BRNC | A18 | |
| 0033 | 01000011 | | 0481 | | TRCY | 12 | |
| 0027 | 00111000 | | 0482 | | TBIT | 0 | |
| 000F | 10111000 | 0499 | 0483 | | BRNC | A18 | |
| 001D | 00111101 | | 0484 | | CIA | | |
| 003A | 01001011 | | 0485 | | TRCY | 13 | |
| 0035 | 00111010 | | 0486 | | TBIT | 1 | |
| 002B | 10000110 | 0502 | 0487 | | BRNC | A19 | |
| 0016 | 00101100 | | 0488 | A20 | LDX | B | |
| 002C | 01001101 | | 0489 | | TRCY | 11 | |
| 0018 | 00100111 | | 0490 | | SMAA | | |
| 0030 | 10101101 | 0506 | 0491 | | BRNC | A21 | |
| 0021 | 01000011 | | 0492 | | TRCY | 12 | |
| 0002 | 00111000 | | 0493 | | TBIT | 0 | |
| 0005 | 10011001 | 0520 | 0494 | | BRNC | A23 | |
| 000B | 00011111 | | 0495 | | LDP | 15 | |
| 0017 | 10010001 | 1033 | 0496 | | BRNC | ERROR2 | RET |
| 002F | 01000001 | | 0497 | A16 | TRCY | 8 | PERCENT KEY |
| 001C | 10011111 | 0471 | 0498 | | BRNC | A17 | RET |
| 0038 | 01001011 | | 0499 | A18 | TRCY | 13 | |
| 0031 | 00111010 | | 0500 | | TBIT | 1 | |
| 0023 | 10010110 | 0488 | 0501 | | BRNC | A20 | |
| 0006 | 00101100 | | 0502 | A19 | LDX | B | |
| 000D | 01001101 | | 0503 | | TRCY | 11 | |
| 0019 | 00100101 | | 0504 | | AMAA | | |
| 0036 | 10011010 | 0507 | 0505 | | BRNC | A24 | |
| 002D | 10110010 | 0521 | 0506 | A21 | BRNC | FIX | |
| 001A | 00101001 | | 0507 | A24 | LDX | A | |
| 0034 | 01001101 | | 0508 | | TRCY | 11 | |
| 0029 | 00100000 | | 0509 | | STIN | | |
| 0012 | 00111000 | | 0510 | | SBIT | 0 | |
| 0024 | 01001011 | | 0511 | A22 | TRCY | 13 | |
| 0008 | 01100000 | | 0512 | | CMIY | 0 | |
| 0011 | 01001011 | | 0513 | | TRCY | 13 | |
| 0022 | 00101101 | | 0514 | | LDX | C | |
| 0004 | 00011100 | | 0515 | | LDP | 3 | |

| PC | INST | BRLN | LINE | NAME | SOURCE STATEMENT TITLE | COMMENTS | |
|---|---|---|---|---|---|---|---|
| 0009 | 00111010 | | 0516 | | TBIT | 1 | |
| 0013 | 10001111 | 0211 | 0517 | | BRNC | A7 | |
| 0026 | 00010010 | | 0518 | | LDP | 4 | |
| 000C | 10000000 | 0272 | 0519 | | BRNC | AX | |
| 0019 | 00110100 | | 0520 | A23 | RBIT | 0 | |
| 0032 | 01000011 | | 0521 | FIX | TRCY | 12 | |
| 0025 | 00111000 | | 0522 | | TBIT | 0 | |
| 000A | 10011010 | 0507 | 0523 | | BRNC | A24 | |
| 0015 | 00101001 | | 0524 | | LDX | A | |
| 002A | 01001101 | | 0525 | | TRCY | 11 | |
| 0014 | 00000011 | | 0526 | | STA | | |
| 0028 | 10100100 | 0511 | 0527 | | BRNC | A22 | RET |
| | | | 0528 | | PAGE | 8 | |
| 0000 | 00100011 | | 0529 | NA1 | TRYA | | |
| 0001 | 01001001 | | 0530 | | TRCY | 9 | |
| 0003 | 00100110 | | 0531 | | MNEO | | |
| 0007 | 10111100 | 0542 | 0532 | | BRNC | NA2 | |
| 000F | 00010110 | | 0533 | | CALLL | SL1 | |
| 001F | 11101100 | 0424 | 0534 | | | | |
| 003F | 00010110 | | 0535 | | CALLL | INCOP | |
| 003E | 11001011 | 0430 | 0536 | | | | |
| 003D | 01001101 | | 0537 | NA3 | TRCY | 11 | |
| 003B | 00101001 | | 0538 | | LDX | A | |
| 0037 | 00100001 | | 0539 | | TRMA | | |
| 002F | 01111001 | | 0540 | | ALEC | 9 | |
| 001E | 10000000 | 0529 | 0541 | | BRNC | NA1 | |
| 003C | 01000101 | | 0542 | NA2 | TRCY | 10 | |
| 0039 | 00100011 | | 0543 | | TRYA | | |
| 0033 | 01100011 | | 0544 | | CMIY | 12 | * |
| 0027 | 00100010 | | 0545 | | TAMY | | |
| 000E | 00010110 | | 0546 | | CALLL | SL2 | |
| 001D | 11100001 | 0427 | 0547 | | | | |
| 003A | 00000011 | | 0548 | | STA | | |
| 0035 | 01000000 | | 0549 | | TRCY | 0 | |
| 002B | 01100000 | | 0550 | | CMIY | 0 | |
| 0016 | 00010101 | | 0551 | | BL | SETUP | RET |
| 002C | 10001101 | 0697 | 0552 | | | | |
| 0018 | 01001011 | | 0553 | ANS2 | TRCY | 13 | |
| 0030 | 00101101 | | 0554 | | LDX | C | |
| 0021 | 00111011 | | 0555 | | TBIT | 3 | |
| 0002 | 10011011 | 0567 | 0556 | | BRNC | A41 | |
| 0005 | 00110101 | | 0557 | | RBIT | 2 | |
| 000B | 01000111 | | 0558 | | TRCY | 14 | |
| 0017 | 00111000 | | 0559 | | TBIT | 0 | |
| 002E | 10001001 | 0579 | 0560 | | BRNC | A43 | |
| 001C | 00111111 | | 0561 | | CLA | | |
| 0038 | 00101001 | | 0562 | A44 | LDX | A | |
| 0031 | 01000111 | | 0563 | | TRCY | 14 | |
| 0023 | 00100000 | | 0564 | | STIN | | |
| 0006 | 00011011 | | 0565 | | LDP | 13 | |
| 000D | 10011110 | 0867 | 0566 | | BRNC | K15 | |
| 001B | 00110111 | | 0567 | A41 | RBIT | 3 | |
| 0036 | 00110110 | | 0568 | | RBIT | 1 | |
| 002D | 01111110 | | 0569 | | ALEC | 7 | X KEY? |
| 001A | 10101001 | 0572 | 0570 | | BRNC | A45A | |
| 0034 | 00110010 | | 0571 | | SBIT | 1 | |
| 0029 | 00101011 | | 0572 | A45A | LDX | B | |
| 0012 | 00110010 | | 0573 | | SBIT | 1 | |
| 0024 | 00101001 | | 0574 | | LDX | A | |
| 0008 | 01001011 | | 0575 | | TRCY | 13 | |
| 0011 | 00110001 | | 0576 | | SBIT | 2 | |
| 0022 | 00010101 | | 0577 | | LDP | 10 | |
| 0004 | 10101011 | 0680 | 0578 | | BRNC | CHOPPER | |
| 0009 | 00110100 | | 0579 | A43 | RBIT | 0 | |
| 0013 | 01000011 | | 0580 | | TRCY | 12 | |
| 0026 | 00100011 | | 0581 | | TRYA | | |
| 000C | 10111000 | 0562 | 0582 | | BRNC | A44 | RET |
| 0019 | 01000000 | | 0583 | ABREG | TRCY | 0 | |
| 0032 | 00101100 | | 0584 | | LDX | B | |
| 0025 | 00100001 | | 0585 | NXD | TRMA | | |
| 000A | 00101001 | | 0586 | | LDX | A | |
| 0015 | 00111110 | | 0587 | | EXMA | | |
| 002A | 00101100 | | 0588 | | LDX | B | |
| 0014 | 00100000 | | 0589 | | STIN | | |
| 0028 | 01011011 | | 0590 | | YNEC | 13 | |

| PC | INST | BRLN | LINE | NAME | SOURCE STATEMENT TITLE | COMMENTS | |
|---|---|---|---|---|---|---|---|
| 0010 | 10100101 | 0585 | 0591 | | BRNC | NXD | |
| 0020 | 00001111 | | 0592 | | RETN | | |
| | | | 0593 | | PAGE | 9 | |
| 0000 | 00110100 | | 0594 | ST4 | RBIT | 0 | |
| 0001 | 00001011 | | 0595 | GT | COMCP | | |
| 0003 | 11000000 | 1625 | 0596 | | CALL | GHREG | |
| 0007 | 11011001 | 1679 | 0597 | | CALL | HREGA | |
| 000F | 00001011 | | 0598 | | COMCP | | |
| 001F | 01100001 | | 0599 | | CMIY | 8 | |
| 003F | 01101011 | | 0600 | | CMIY | 13 | |
| 003E | 00011111 | | 0601 | | LDP | 15 | |
| 003D | 11110101 | 1006 | 0602 | | CALL | CLREGH | |
| 003B | 00011011 | | 0603 | | LDP | 13 | |
| 0037 | 10110011 | 0870 | 0604 | | BRNC | ROUTE | BET |
| 002F | 00101110 | | 0605 | K7 | LDX | F | |
| 001F | 00110001 | | 0606 | | SBIT | 2 | MEMORY FLAG |
| 003C | 00001011 | | 0607 | | COMCP | | |
| 0039 | 11000000 | 1625 | 0608 | | CALL | GHREG | |
| 0033 | 00001011 | | 0609 | | COMCP | | |
| 0027 | 00101000 | | 0610 | K7B | LDX | 0 | |
| 000E | 01000000 | | 0611 | | TRCY | 0 | |
| 001D | 00100001 | | 0612 | | TRMA | | |
| 003A | 01001011 | | 0613 | | TRCY | 13 | |
| 0035 | 00101011 | | 0614 | | LDX | H | |
| 002B | 00011011 | | 0615 | | LDP | 13 | |
| 0016 | 10001110 | 0872 | 0616 | | BRNC | M+= | |
| 002C | 00101101 | | 0617 | F=+ | LDX | C | |
| 0018 | 00111000 | | 0618 | | TBIT | 0 | |
| 0030 | 10001011 | 0623 | 0619 | | BRNC | C11S | |
| 0021 | 00011011 | | 0620 | C21 | LDP | 13 | |
| 0002 | 00001011 | | 0621 | | COMCP | | |
| 0005 | 10000000 | 1880 | 0622 | | BRNC | C12S | |
| 000B | 00001011 | | 0623 | C11S | COMCP | | |
| 0017 | 11110111 | 1635 | 0624 | | CALL | EHREG | |
| 002F | 11011100 | 1657 | 0625 | | CALL | EFREG | |
| 001C | 00001011 | | 0626 | | COMCP | | |
| 0038 | 10100001 | 0620 | 0627 | | BRNC | C21 | BET |
| 0031 | 01000000 | | 0628 | CKEGE | TRCY | 0 | |
| 0023 | 00101101 | | 0629 | ROBB | LDX | C | |
| 0006 | 00100001 | | 0630 | | TRMA | | |
| 000D | 00101010 | | 0631 | | LDX | E | |
| 0019 | 00100000 | | 0632 | | STIN | | |
| 0036 | 01011011 | | 0633 | | YNEC | 13 | |
| 002D | 10100011 | 0629 | 0634 | | BRNC | ROBB | |
| 001A | 00001111 | | 0635 | | RETN | | |
| 0034 | 01000000 | | 0636 | AREGB | TRCY | 0 | |
| 0029 | 00101001 | | 0637 | C40 | LDX | A | |
| 0012 | 00100001 | | 0638 | | TRMA | | |
| 0024 | 00101100 | | 0639 | | LDX | B | |
| 0008 | 00100000 | | 0640 | | STIN | | |
| 0011 | 01011011 | | 0641 | | YNEC | 13 | |
| 0022 | 10101001 | 0637 | 0642 | | BRNC | C40 | |
| 0004 | 00001111 | | 0643 | | RETN | | RETUR· |
| 0009 | 00101010 | | 0644 | ST3 | LDX | E | |
| 0013 | 00111000 | | 0645 | | TBIT | 0 | |
| 0026 | 10000000 | 0594 | 0646 | | BRNC | ST4 | |
| 000C | 00110000 | | 0647 | | SBIT | 0 | |
| 0019 | 00011011 | | 0648 | | BL | K13 | BET |
| 0032 | 10010010 | 0899 | 0649 | | | | |
| 0025 | 00110111 | | 0650 | E1 | RBIT | 3 | |
| 000A | 00100001 | | 0651 | | TRMA | | |
| 0015 | 01001101 | | 0652 | | TRCY | 11 | |
| 002A | 00101011 | | 0653 | | LDX | H | |
| 0014 | 00011111 | | 0654 | | LDP | 15 | |
| 0028 | 01111100 | | 0655 | | ALEC | 3 | |
| 0010 | 10101000 | 1047 | 0656 | | BRNC | E3 | |
| 0020 | 10101010 | 1045 | 0657 | | BRNC | E2 | BET |
| | | | 0658 | | PAGE | 10 | |
| 0000 | 00111001 | | 0659 | D++ | SBIT | 2 | |
| 0001 | 00111000 | | 0660 | | TBIT | 0 | |
| 0003 | 10011000 | 0683 | 0661 | | BRNC | SUBA | |
| 0007 | 01000101 | | 0662 | | TRCY | 10 | |
| 000F | 00000100 | | 0663 | | A2AA | | |
| 001F | 01111000 | | 0664 | | ALEC | 1 | |
| 003F | 10111001 | 0673 | 0665 | | BRNC | A49 | |

| PC | INST | BRLN | LINE | NAME | SOURCE STATEMENT TITLE | COMMENTS | |
|---|---|---|---|---|---|---|---|
| 003F | 10101011 | 0680 | 0666 | | BRNC | CHOPPER | |
| 003D | 00110101 | | 0667 | A+ | RBIT | 2 | |
| 003B | 00011101 | | 0668 | ERRORC | LDP | 11 | |
| 0037 | 11000000 | 0725 | 0669 | | CALL | SCAN | |
| 002F | 10111001 | 1703 | 0670 | | BRNC | A++ | |
| 001E | 01000101 | | 0671 | SR | TRCY | 10 | |
| 003C | 00111111 | | 0672 | SR1 | CLA | | |
| 0039 | 00111110 | | 0673 | A49 | EXMA | | |
| 0033 | 00111100 | | 0674 | | DCY | | |
| 0027 | 10111001 | 0673 | 0675 | | BRNC | A49 | |
| 000F | 00001111 | | 0676 | | RETN | | |
| 001D | 00001011 | | 0677 | | COMCP | | |
| 0034 | 11000000 | 1689 | 0678 | | CALL | DECDP1 | |
| 0035 | 00001011 | | 0679 | | COMCP | | |
| 0028 | 00010010 | | 0680 | CHOPPER | LDP | 4 | |
| 0016 | 00001011 | | 0681 | | COMCP | | |
| 002C | 10011110 | 1314 | 0682 | | BRNC | PR | |
| 0018 | 01110000 | | 0683 | SUBA | ALEC | 0 | |
| 0030 | 10010111 | 0689 | 0684 | | BRNC | COMPL2 | |
| 0021 | 01000011 | | 0685 | | TRCY | 12 | |
| 0002 | 00010100 | | 0686 | | LDP | 2 | |
| 0005 | 11110010 | 0197 | 0687 | | CALL | TOGL | |
| 0003 | 10101011 | 0680 | 0688 | | BRNC | CHOPPER | |
| 0017 | 00010111 | | 0689 | COMPL2 | LDP | 14 | |
| 002E | 11101100 | 0943 | 0690 | | CALL | COMPL | |
| 001C | 10101011 | 0680 | 0691 | | BRNC | CHOPPER | |
| 003A | 00000101 | | 0692 | SETDP | INY | | |
| 0031 | 00010110 | | 0693 | SETDP1 | LDP | 6 | |
| 0023 | 11100001 | 0427 | 0694 | | CALL | SL2 | |
| 0006 | 00000011 | | 0695 | | STA | | |
| | | | 0696 | | TRACE | | |
| 000D | 00011111 | | 0697 | SETUP | LDP | 15 | |
| 001B | 00101100 | | 0698 | | LDX | 8 | |
| 0036 | 11101100 | 1009 | 0699 | | CALL | C35 | |
| 002D | 00011111 | | 0700 | | LDP | 15 | |
| 001A | 00111001 | | 0701 | | TBIT | 2 | |
| 0034 | 10010010 | 1030 | 0702 | | BRNC | ERROR | |
| 0029 | 00001011 | | 0703 | SETUPR | COMCP | | |
| 0012 | 00011110 | | 0704 | | BL | SETUP1 | |
| 0024 | 10010101 | 1553 | 0705 | | | | |
| 0008 | 00111001 | | 0706 | CHOP1 | TBIT | 2 | |
| 0011 | 10111101 | 0667 | 0707 | | BRNC | A+ | |
| 0022 | 00011010 | | 0708 | | LDP | 5 | |
| 0004 | 10111110 | 0343 | 0709 | | BRNC | CO | |
| 0009 | 00000011 | | 0710 | FILL1 | STA | | |
| 0013 | 01000110 | | 0711 | | TRCY | 6 | SETS TIME |
| 0026 | 00000000 | | 0712 | FILL2 | DCMA | | |
| 000C | 10001001 | 0710 | 0713 | | BRNC | FILL1 | |
| 0019 | 01100001 | | 0714 | FILLER | CMIY | 8 | |
| 0032 | 01011011 | | 0715 | | YNEC | 13 | |
| 0025 | 10100110 | 0712 | 0716 | | BRNC | FILL2 | |
| 000A | 01100000 | | 0717 | | CMIY | 0 | |
| 0015 | 10001101 | 0697 | 0718 | | BRNC | SETUP | BET |
| 002A | 00100001 | | 0719 | DELAY | TRMA | | |
| 0014 | 00101001 | | 0720 | | LDX | A | |
| 0028 | 01000011 | | 0721 | | TRCY | 12 | |
| 0010 | 00100000 | | 0722 | | STIM | | |
| 0020 | 10011001 | 0714 | 0723 | | BRNC | FILLER | BET |
| | | | 0724 | | PAGE | 11 | |
| 0000 | 00101000 | | 0725 | SCAN | LDX | 0 | |
| 0001 | 01001100 | | 0726 | | TRCY | 3 | |
| 0003 | 00100011 | | 0727 | | TRYA | | |
| 0007 | 01001111 | | 0728 | | TRCY | 15 | |
| 000F | 00100110 | | 0729 | | MNEO | | |
| 001F | 10110110 | 0764 | 0730 | | BRNC | H2 | |
| 003F | 00000110 | | 0731 | H4 | A6AA | | |
| 003E | 00001010 | | 0732 | | LDO | | |
| 003D | 00000110 | | 0733 | | A6AA | | |
| 003B | 00000110 | | 0734 | | A6AA | | |
| 0037 | 00000111 | | 0735 | | DCA | | |
| 002F | 00001110 | | 0736 | | KNEO | | |
| 001E | 10011010 | 0766 | 0737 | | BRNC | H5 | |
| 003C | 01111001 | | 0738 | H6 | ALEC | 9 | |
| 0039 | 10111111 | 0731 | 0739 | | BRNC | H4 | |

| PC | INST | BRLN | LINE | NAME | SOURCE STATEMENT TITLE | COMMENTS | |
|---|---|---|---|---|---|---|---|
| 0033 | 01000111 | | 0740 | | TRCY | 14 | |
| 0027 | 00111111 | | 0741 | H10 | CLA | | |
| 000E | 00111000 | | 0742 | | TBIT | 0 | |
| 0010 | 10110101 | 0745 | 0743 | | BRNC | H11 | |
| 003A | 00000100 | | 0744 | | A2AA | | |
| 0035 | 00111010 | | 0745 | H11 | TBIT | 1 | |
| 0028 | 10101100 | 0748 | 0746 | | BRNC | H12 | |
| 0016 | 00000100 | | 0747 | | A2AA | | |
| 002C | 00111001 | | 0748 | H12 | TBIT | 2 | |
| 0018 | 10100001 | 0751 | 0749 | | BRNC | H13 | |
| 0030 | 00000100 | | 0750 | | A2AA | | |
| 0021 | 00111011 | | 0751 | H13 | TBIT | 3 | |
| 0002 | 10001011 | 0754 | 0752 | | BRNC | CKAUTO | |
| 0005 | 00000100 | | 0753 | | A2AA | | |
| 000B | 01001111 | | 0754 | CKAUTO | TRCY | 15 | |
| 0017 | 01110000 | | 0755 | | ALEC | 0 | |
| 002F | 10100101 | 0781 | 0756 | | BRNC | H14A | |
| 001C | 00001011 | | 0757 | H14 | COMCP | | |
| 0039 | 01110010 | | 0758 | | ALEC | 4 | |
| 0031 | 10111000 | 1785 | 0759 | | BRNC | H1 | |
| 0023 | 01001111 | | 0760 | BUF | TRCY | 15 | |
| 0006 | 00100001 | | 0761 | | TRMA | | |
| 000D | 00101111 | | 0762 | | LDX | G | |
| 0013 | 10000000 | 1752 | 0763 | | BRNC | BUFA | BET |
| 0036 | 00001011 | | 0764 | H2 | COMCP | | |
| 002D | 10000110 | 1788 | 0765 | | BRNC | H20 | BET |
| 001A | 01001111 | | 0766 | H5 | TRCY | 15 | |
| 0039 | 00000111 | | 0767 | | DCA | | |
| 0029 | 00000011 | | 0768 | | STA | | |
| 0012 | 01000111 | | 0769 | | TRCY | 14 | |
| 0024 | 00001000 | | 0770 | | TRKA | | |
| 0008 | 00100110 | | 0771 | | MNEO | | |
| 0011 | 10101000 | 0786 | 0772 | | BRNC | H8A | |
| 0022 | 01110000 | | 0773 | | ALEC | 0 | |
| 0004 | 10011001 | 0779 | 0774 | | BRNC | H8 | |
| 0009 | 00100000 | | 0775 | H9A | STIN | | |
| 0013 | 00000010 | | 0776 | H9 | INMA | | |
| 0026 | 10111100 | 0738 | 0777 | | BRNC | H6 | DUMMY** |
| 000C | 10111100 | 0738 | 0778 | | BRNC | H6 | |
| 0019 | 01101100 | | 0779 | H8 | CMIY | 3 | |
| 0032 | 10010011 | 0776 | 0780 | | BRNC | H9 | BET |
| 0025 | 00100010 | | 0781 | H14A | TRMY | | |
| 000A | 01011110 | | 0782 | | YNEC | 7 | |
| 0015 | 10011100 | 0757 | 0783 | | BRNC | H14 | |
| 002A | 00100011 | | 0784 | | TRYA | | |
| 0014 | 10011100 | 0757 | 0785 | | BRNC | H14 | |
| 0028 | 01110111 | | 0786 | H8A | ALEC | 14 | |
| 0010 | 10011001 | 0779 | 0787 | | BRNC | H8 | |
| 0020 | 10001001 | 0775 | 0788 | | BRNC | H9A | |
| | | | 0789 | | PAGE | 12 | |
| 0000 | 11001101 | 0827 | 0790 | ZEROBAR | CALL | ZERO | |
| 0001 | 01011101 | | 0791 | | YNEC | 11 | |
| 0003 | 10001111 | 0794 | 0792 | | BRNC | LZ | |
| 0007 | 01001000 | | 0793 | | TRCY | 1 | |
| 000F | 00100011 | | 0794 | LZ | TRYA | | |
| 001F | 01001101 | | 0795 | | TRCY | 11 | |
| 003F | 00100111 | | 0796 | | SMAA | | |
| 003E | 10001000 | 0836 | 0797 | | BRNC | P23 | |
| 003D | 00100111 | | 0798 | | SMAA | | |
| 003B | 00100100 | | 0799 | P24 | TRAY | | |
| 0037 | 00001111 | | 0800 | | RETN | | |
| 002F | 10111100 | 0803 | 0801 | | BRNC | LZ2 | |
| 001E | 01100111 | | 0802 | LZ1 | CMIY | 14 | |
| 003C | 11011101 | | 0803 | LZ2 | YNEC | 11 | |
| 0039 | 10011110 | 0802 | 0804 | | BRNC | LZ1 | |
| 0033 | 01000000 | | 0805 | AREGE | TRCY | 0 | |
| 0027 | 00101001 | | 0806 | P25 | LDX | A | |
| 000E | 00100001 | | 0807 | | TRMA | | |
| 0010 | 01111011 | | 0808 | | ALEC | 13 | |
| 003A | 10101011 | 0811 | 0809 | | BRNC | P26 | |
| 0035 | 00111111 | | 0810 | | CLA | | |
| 002B | 00101010 | | 0811 | P26 | LDX | E | |
| 0016 | 00100000 | | 0812 | | STIN | | |
| 002C | 01011011 | | 0813 | | YNEC | 13 | |

| PC | INST | BRLN | LINE | SOURCE STATEMENT NAME | TITLE | COMMENTS | |
|---|---|---|---|---|---|---|---|
| 0013 | 10100111 | 0806 | 0814 | | BRNC | P25 | |
| 0030 | 00101001 | | 0815 | | LDX | A | |
| 0021 | 01000111 | | 0816 | | TRCY | 14 | |
| 0002 | 00001111 | | 0817 | | RETN | | |
| 0005 | 00100001 | | 0818 | | TRMA | | |
| 0008 | 00010110 | | 0819 | | LDP | 6 | |
| 0017 | 11101100 | 0424 | 0820 | | CALL | SL1 | |
| 002E | 01000101 | | 0821 | | TRCY | 10 | |
| 001C | 00100011 | | 0822 | | TRYA | | |
| 0038 | 01001101 | | 0823 | | TRCY | 11 | |
| 0031 | 00100010 | | 0824 | | TRMY | | |
| 0023 | 00010101 | | 0825 | | LDP | 10 | |
| 0006 | 10111000 | 0692 | 0826 | | BRNC | SFTOP | BET |
| 000D | 01001001 | | 0827 | ZERO | TRCY | 9 | |
| 0019 | 00100110 | | 0828 | P21 | MNEO | | |
| 0036 | 10000100 | 0839 | 0829 | | BRNC | P20 | |
| 0020 | 00111100 | | 0830 | | DCY | | |
| 001A | 10011011 | 0828 | 0831 | | BRNC | P21 | |
| 0034 | 01000011 | | 0832 | | TRCY | 12 | |
| 0029 | 00110111 | | 0833 | | RBIT | 3 | |
| 0012 | 01001101 | | 0834 | | TRCY | 11 | |
| 0024 | 00001111 | | 0835 | | RETN | | |
| 0008 | 00000010 | | 0836 | P23 | INMA | | |
| 0011 | 00100100 | | 0837 | | TRAY | | |
| 0022 | 10111011 | 0799 | 0838 | | BRNC | P24 | |
| 0004 | 00000101 | | 0839 | P20 | INY | | |
| 0009 | 00001111 | | 0840 | | RETN | | |
| 0013 | 01010101 | | 0841 | | YNEC | 10 | |
| 0026 | 10110010 | 0845 | 0842 | | BRNC | P22 | |
| 000C | 00001011 | | 0843 | R05 | COMCP | | |
| 0019 | 10010000 | 1877 | 0844 | | BRNC | R06 | |
| 0032 | 11001111 | 0794 | 0845 | P22 | CALL | LZ | |
| 0025 | 01110101 | | 0846 | TESTA | ALEC | 10 | |
| 000A | 10101010 | 0849 | 0847 | | BRNC | TEST1 | |
| 0015 | 10001100 | 0843 | 0848 | | BRNC | R05 | |
| 002A | 01111001 | | 0849 | TEST1 | ALEC | 9 | |
| 0014 | 10010000 | 0852 | 0850 | | BRNC | TEST3 | |
| 0028 | 01001001 | | 0851 | TEST2 | TRCY | 9 | |
| 0010 | 01101111 | | 0852 | TEST3 | CMIY | 15 | |
| 0020 | 10111100 | 0803 | 0853 | | BRNC | LZ2 | |
| | | | 0854 | | PAGE | 13 | |
| 0000 | 00111000 | | 0855 | S,T | TBIT | 0 | |
| 0001 | 10100101 | 0911 | 0856 | | BRNC | ST1 | |
| 0003 | 00010100 | | 0857 | | CALLL | RESET | |
| 0007 | 11001011 | 0171 | 0858 | | | | |
| 000F | 00101100 | | 0859 | | LDX | B | |
| 001F | 00111000 | | 0860 | | TBIT | 0 | |
| 003F | 10100110 | 0907 | 0861 | | BRNC | NONAD | |
| 003E | 00001011 | | 0862 | STTL | COMCP | | |
| 003D | 00011001 | | 0863 | | LDP | 9 | |
| 003B | 11011001 | 1679 | 0864 | | CALL | BREGA | |
| 0037 | 00001011 | | 0865 | | COMCP | | |
| 002F | 01100111 | | 0866 | | CMIY | 14 | |
| 001E | 01001111 | | 0867 | K15 | TRCY | 15 | |
| 003C | 00101001 | | 0868 | | LDX | A | |
| 0039 | 01101011 | | 0869 | | CMIY | 13 | |
| 0033 | 00001011 | | 0870 | ROUTE | COMCP | | |
| 0027 | 10110011 | 1895 | 0871 | | BRNC | B+ | |
| 000E | 00110111 | | 0872 | M+= | RBIT | 3 | |
| 001D | 01110100 | | 0873 | | ALEC | 2 | |
| 003A | 10101011 | 0876 | 0874 | | BRNC | K10 | |
| 0035 | 00110011 | | 0875 | | SBIT | 3 | |
| 002B | 00101101 | | 0876 | K10 | LDX | C | |
| 0016 | 00111000 | | 0877 | | TBIT | 0 | |
| 002C | 10110000 | 0880 | 0878 | | BRNC | K12 | |
| 0018 | 10000010 | 0882 | 0879 | | BRNC | ADMODE | |
| 0030 | 00011001 | | 0880 | K12 | LDP | 9 | |
| 0021 | 11110001 | 0628 | 0881 | | CALL | CREGE | |
| 0002 | 00101100 | | 0882 | ADMODE | LDX | B | |
| 0005 | 00100010 | | 0883 | | TRMY | | |
| 0009 | 01011000 | | 0884 | | YNEC | 1 | |
| 0017 | 10011010 | 0896 | 0885 | | BRNC | K11 | |
| 002E | 01001111 | | 0886 | | TRCY | 15 | |
| 001C | 00101110 | | 0887 | | LDX | F | |

| PC | INST | BRLN | LINE | NAME | SOURCE STATEMENT TITLE | COMMENTS | |
|---|---|---|---|---|---|---|---|
| 0038 | 00111010 | | 0888 | | TBIT | 1 | |
| 0031 | 10011010 | 0896 | 0889 | | BRNC | K11 | FIXED MODE |
| 0023 | 00111011 | | 0890 | | TBIT | 3 | |
| 0006 | 10011011 | 0893 | 0891 | | BRNC | K11A | |
| 000D | 10011010 | 0896 | 0892 | | BRNC | K11 | |
| 0018 | 00101001 | | 0893 | K11A | LDX | A | |
| 0036 | 01001101 | | 0894 | | TRCY | 11 | |
| 002D | 01100100 | | 0895 | | CMIY | 2 | |
| 001A | 00011001 | | 0896 | K11 | LDP | 9 | |
| 0034 | 01001011 | | 0897 | | TRCY | 13 | |
| 0029 | 10101100 | 0617 | 0898 | | BRNC | F=+ | |
| 0012 | 00011001 | | 0899 | K13 | LDP | 9 | |
| 0024 | 00001011 | | 0900 | | COMCP | | |
| 0008 | 11011001 | 1679 | 0901 | | CALL | BREGA | |
| 0011 | 00001011 | | 0902 | | COMCP | | |
| 0022 | 00011111 | | 0903 | | LDP | 15 | |
| 0004 | 11110101 | 1006 | 0904 | | CALL | CLREGB | |
| 0009 | 00011001 | | 0905 | | BL | K7 | BET |
| 0013 | 10101111 | 0605 | 0906 | | | | |
| 0026 | 00010011 | | 0907 | NONAD | CALLL | AREGE | |
| 000C | 11110011 | 0805 | 0908 | | | | |
| 0019 | 00010001 | | 0909 | | BL | NA3 | BET |
| 0032 | 10111101 | 0537 | 0910 | | | | |
| 0025 | 00101001 | | 0911 | ST1 | LDX | A | |
| 000A | 00100001 | | 0912 | | TRMA | | |
| 0015 | 01001011 | | 0913 | | TRCY | 13 | |
| 002A | 00101100 | | 0914 | | LDX | B | |
| 0014 | 00011000 | | 0915 | | LDP | 1 | |
| 0028 | 00111000 | | 0916 | | TBIT | 0 | |
| 0010 | 10111010 | 0096 | 0917 | | BRNC | ST2 | |
| 0020 | 10101100 | 0100 | 0918 | | BRNC | ST5 | BET |
| | | | 0919 | | PAGE | 14 | |
| 0000 | 00111000 | | 0920 | D+ | TBIT | 0 | |
| 0001 | 11101100 | 0943 | 0921 | | CALL | COMPL | |
| 0003 | 11110100 | 0962 | 0922 | | CALL | ADD | |
| 0007 | 01001011 | | 0923 | | TRCY | 13 | |
| 000F | 00010101 | | 0924 | | LDP | 10 | |
| 001F | 10000000 | 0659 | 0925 | | BRNC | D++ | |
| 003F | 00110100 | | 0926 | K2 | RBIT | 0 | |
| 003E | 00101001 | | 0927 | DISP6 | LDX | A | |
| 003D | 01001111 | | 0928 | | TRCY | 15 | |
| 003B | 01100000 | | 0929 | | CMIY | 0 | |
| 0037 | 01001011 | | 0930 | | TRCY | 13 | |
| 002F | 00010110 | | 0931 | | LDP | 6 | |
| 001E | 00111011 | | 0932 | | TBIT | 3 | |
| 003C | 10001000 | 0401 | 0933 | | BRNC | RP | |
| 0039 | 01100000 | | 0934 | | CMIY | 0 | |
| 0033 | 00101110 | | 0935 | DISP2 | LDX | F | |
| 0027 | 01001011 | | 0936 | | TRCY | 13 | |
| 000E | 01100000 | | 0937 | | CMIY | 0 | |
| 001D | 00011000 | | 0938 | | LDP | 1 | |
| 003A | 10001111 | 0081 | 0939 | | BRNC | NX | |
| 0035 | 01001111 | | 0940 | SUB | TRCY | 15 | |
| 002B | 00101101 | | 0941 | | LDX | C | |
| 0016 | 00110010 | | 0942 | | SBIT | 1 | |
| 002C | 01001111 | | 0943 | COMPL | TRCY | 15 | |
| 0018 | 00000101 | | 0944 | COMPL1 | INY | | |
| 0030 | 00000000 | | 0945 | | DCMA | | |
| 0021 | 10001011 | 0949 | 0946 | | BRNC | C144 | |
| 0002 | 01010101 | | 0947 | | YNEC | 10 | |
| 0005 | 10011000 | 0944 | 0948 | | BRNC | COMPL1 | |
| 000B | 00111101 | | 0949 | C144 | CTA | | |
| 0017 | 01101001 | | 0950 | | CMIY | 9 | |
| 002E | 00111100 | | 0951 | | DCY | | |
| 001C | 00100101 | | 0952 | | AMAA | | |
| 0038 | 00100000 | | 0953 | | STIN | | |
| 0031 | 01011101 | | 0954 | | YNEC | 11 | |
| 0023 | 10011000 | 0982 | 0955 | | BRNC | C145 | |
| 0006 | 01001111 | | 0956 | | TRCY | 15 | |
| 000D | 00111010 | | 0957 | | TBIT | 1 | |
| 001B | 10101101 | 0960 | 0958 | | BRNC | ACHB1 | |
| 0036 | 00001111 | | 0959 | | RETN | | |
| 002D | 00111110 | | 0960 | ACHB1 | RBIT | 1 | |
| 001B | 00101100 | | 0961 | ACHB | LDX | B | |

| PC | INST | BRLN | LINE | NAME | SOURCE STATEMENT TITLE | COMMENTS | |
|---|---|---|---|---|---|---|---|
| 0034 | 01000000 | | 0962 | ADD | TRCY | 0 | |
| 0029 | 00111111 | | 0963 | | CLA | | |
| 0012 | 00001001 | | 0964 | C140 | COMX | | |
| 0024 | 00100111 | | 0965 | | SMAA | | |
| 0008 | 00001001 | | 0966 | | COMX | | |
| 0011 | 00100101 | | 0967 | | AMAA | | |
| 0022 | 10010011 | 0971 | 0968 | | BRNC | C141 | |
| 0004 | 01111001 | | 0969 | | ALEC | 9 | |
| 0009 | 10101010 | 0979 | 0970 | | BRNC | C142 | |
| 0013 | 00000110 | | 0971 | C141 | A6AA | | |
| 0026 | 00000011 | | 0972 | | STA | | |
| 000C | 00111111 | | 0973 | | CLA | | |
| 0019 | 00000111 | | 0974 | | DCA | | |
| 0032 | 00000101 | | 0975 | C143 | INY | | |
| 0025 | 01011101 | | 0976 | | YNEC | 11 | |
| 000A | 10010010 | 0964 | 0977 | | BRNC | C140 | |
| 0015 | 00001111 | | 0978 | | RETN | | |
| 002A | 00000011 | | 0979 | C142 | STA | | |
| 0014 | 00111111 | | 0980 | | CLA | | |
| 0028 | 10110010 | 0975 | 0981 | | BRNC | C143 | RET |
| 0010 | 00100001 | | 0982 | C145 | TRMA | | |
| 0020 | 10001011 | 0949 | 0983 | | BRNC | C144 | RET |
| | | | 0984 | | PAGE | 15 | |
| 0000 | 00101010 | | 0985 | PUC | LDX | F | |
| 0001 | 01001011 | | 0986 | | TRCY | 13 | |
| 0003 | 11011000 | 1010 | 0987 | | CALL | CLRAM | |
| | | | 0988 | | NOTRACE | | |
| 0007 | 00101100 | | 0989 | | LDX | B | |
| 000F | 11011000 | 1010 | 0990 | | CALL | CLRAM | |
| 001F | 00101101 | | 0991 | | LDX | E | |
| 003F | 11011000 | 1010 | 0992 | | CALL | CLRAM | |
| 003E | 00101001 | | 0993 | | LDX | A | |
| 0030 | 11011000 | 1010 | 0994 | | CALL | CLRAM | |
| 003B | 00101110 | | 0995 | | LDX | F | |
| 0037 | 11011000 | 1010 | 0996 | | CALL | CLRAM | |
| 002F | 00101111 | | 0997 | | LDX | G | |
| 001F | 11011000 | 1010 | 0998 | | CALL | CLRAM | |
| 003C | 00101011 | | 0999 | | LDX | H | |
| 0039 | 11011000 | 1010 | 1000 | | CALL | CLRAM | |
| 0033 | 00101000 | | 1001 | | LDX | 0 | |
| 0027 | 11011000 | 1010 | 1002 | | CALL | CLRAM | |
| 000F | 01000100 | | 1003 | | TRCY | 2 | |
| 001D | 00011100 | | 1004 | | LDP | 3 | |
| 003A | 10000000 | 0207 | 1005 | | BRNC | STARTUP | RET |
| 0035 | 00101011 | | 1006 | CLREGH | LDX | H | |
| 002B | 10101100 | 1009 | 1007 | | BRNC | C35 | |
| 0016 | 00101001 | | 1008 | CLREGA | LDX | A | |
| 002C | 01000000 | | 1009 | C35 | TRCY | 0 | |
| 0018 | 01100000 | | 1010 | CLRAM | CMIY | 0 | |
| 0030 | 01011011 | | 1011 | | YNEC | 13 | |
| 0021 | 10011000 | 1010 | 1012 | | BRNC | CLRAM | |
| 0002 | 00001111 | | 1013 | | RETN | | RETUR' |
| 0005 | 00111111 | | 1014 | ERROR1 | CLA | | |
| 0008 | 00101010 | | 1015 | ERROR1A | LDX | E | |
| 0017 | 11101100 | 1009 | 1016 | | CALL | C35 | |
| 002E | 00101001 | | 1017 | | LDX | A | |
| 001C | 01100100 | | 1018 | | CMIY | 2 | |
| 0038 | 01001111 | | 1019 | | TRCY | 15 | |
| 0031 | 01101001 | | 1020 | E4 | CMIY | 9 | |
| 0023 | 00100000 | | 1021 | | STIN | | |
| 0006 | 01101101 | | 1022 | | CMIY | 11 | |
| 000D | 01101011 | | 1023 | | CMIY | 13 | |
| 001B | 01100000 | | 1024 | | CMIY | 0 | |
| 0036 | 01101011 | | 1025 | E5 | CMIY | 13 | |
| 002D | 01101011 | | 1026 | | CMIY | 13 | |
| 001A | 01100011 | | 1027 | | CMIY | 12 | |
| 0034 | 00011000 | | 1028 | | LDP | 1 | |
| 0029 | 10101010 | 0136 | 1029 | | BRNC | K6 | |
| 0012 | 00110101 | | 1030 | ERROR | RAIT | 2 | |
| 0024 | 00111011 | | 1031 | | TAIT | 3 | |
| 0009 | 10110010 | 1041 | 1032 | | BRNC | PERR1 | |
| 0011 | 00101101 | | 1033 | ERROR2 | LDX | C | |
| 0022 | 01001011 | | 1034 | | TRCY | 13 | |
| 0004 | 10011000 | 1010 | 1035 | | BRNC | CLRAM | |

| PC | INST | BRLN | LINE | NAME | SOURCE STATEMENT TITLE | COMMENTS | |
|---|---|---|---|---|---|---|---|
| 0009 | 00011001 | | 1036 | CKERR | LDP | 9 | |
| 0013 | 00111011 | | 1037 | | THIT | 3 | |
| 0026 | 10100101 | 0650 | 1038 | | BRNC | E1 | |
| 000C | 00001011 | | 1039 | | COMCP | | |
| 0019 | 10101001 | 1668 | 1040 | | BRNC | EREGA | |
| 0032 | 00101110 | | 1041 | PERR1 | LDX | F | |
| 0025 | 00110011 | | 1042 | | SHIT | 3 | |
| 000A | 00010101 | | 1043 | | BL | SETUPR | |
| 0015 | 10101001 | 0703 | 1044 | | | | |
| 002A | 01000001 | | 1045 | E2 | TRCY | 8 | |
| 0014 | 00101111 | | 1046 | | LDX | G | |
| 0026 | 00100011 | | 1047 | E3 | TRYA | | |
| 0010 | 11101100 | 1009 | 1048 | | CALL | C35 | |
| 0020 | 10001011 | 1015 | 1049 | | BRNC | ERROR1A | RET |
| | | | 1050 | | PAGE | 0 | |
| | | | 1051 | * | CHAPTER | 1 | |
| 0000 | 00100100 | | 1052 | LOOKUP | TRAY | | |
| 0001 | 00101001 | | 1053 | | LDX | A | |
| 0003 | 00100001 | | 1054 | | TRMA | | |
| 0007 | 00101110 | | 1055 | | LDX | F | |
| 000F | 01010000 | | 1056 | | YNEC | 0 | |
| 001F | 10010001 | 1099 | 1057 | | BRNC | NUMS | |
| 003F | 00010000 | | 1058 | | LDP | 0 | |
| 003E | 01100000 | | 1059 | TR3 | CMIY | 0 | |
| 003D | 01100000 | | 1060 | | CMIY | 0 | |
| 003B | 01100000 | | 1061 | | CMIY | 0 | |
| 0037 | 01100000 | | 1062 | | CMIY | 0 | |
| 002F | 01100000 | | 1063 | | CMIY | 0 | |
| 001F | 01100000 | | 1064 | | CMIY | 0 | |
| 003C | 01100000 | | 1065 | | CMIY | 0 | |
| 0039 | 01100000 | | 1066 | | CMIY | 0 | |
| 0033 | 01100000 | | 1067 | | CMIY | 0 | |
| 0027 | 01000000 | | 1068 | | TRCY | 0 | |
| 000E | 01111001 | | 1069 | | ALEC | 9 | |
| 001D | 10110110 | 1091 | 1070 | | BRNC | TR17 | |
| 003A | 01110011 | | 1071 | TS7 | ALEC | 12 | |
| 0035 | 10101110 | 1083 | 1072 | | BRNC | TR20 | |
| 002B | 01111011 | | 1073 | | ALEC | 13 | |
| 0016 | 10001011 | 1081 | 1074 | | BRNC | TR22 | |
| 002C | 00011010 | | 1075 | | LDP | 5 | |
| 0018 | 01100110 | | 1076 | | CMIY | 6 | |
| 0030 | 01100100 | | 1077 | | CMIY | 2 | |
| 0021 | 01110111 | | 1078 | | ALEC | 14 | |
| 0002 | 10101101 | 1406 | 1079 | | BRNC | LUS | |
| 0005 | 10110001 | 1400 | 1080 | | BRNC | LUA | RET |
| 000B | 00011000 | | 1081 | TR22 | LDP | 1 | |
| 0017 | 10001100 | 1165 | 1082 | | BRNC | LUD | RET |
| 002E | 01111101 | | 1083 | TS20 | ALEC | 11 | |
| 001C | 10100011 | 1087 | 1084 | | BRNC | TR21 | |
| 0038 | 00011011 | | 1085 | | LDP | 13 | |
| 0031 | 10010011 | 1931 | 1086 | | BRNC | LUP | RET |
| 0023 | 00010100 | | 1087 | TR21 | LDP | 2 | |
| 0006 | 01110101 | | 1088 | | ALEC | 10 | |
| 000D | 10100100 | 1221 | 1089 | | BRNC | LUX | |
| 001B | 10111110 | 1183 | 1090 | | BRNC | LUT | RET |
| 0036 | 01111010 | | 1091 | TR17 | ALEC | 5 | |
| 0020 | 10001001 | 1102 | 1092 | | BRNC | TR18 | |
| 0013 | 01110001 | | 1093 | | ALEC | 8 | |
| 0034 | 10100100 | 1097 | 1094 | | BRNC | TR19 | |
| 0029 | 00011010 | | 1095 | | LDP | 5 | |
| 0012 | 10110101 | 1386 | 1096 | | BRNC | LUC | RET |
| 0024 | 00010100 | | 1097 | TR19 | BL | LUGT | RET |
| 0008 | 10100111 | 1192 | 1098 | | | | |
| 0011 | 01000000 | | 1099 | NUMS | TRCY | 0 | |
| 0022 | 00011100 | | 1100 | | BL | NUM | RET |
| 0004 | 10000000 | 1237 | 1101 | | | | |
| 0009 | 00010011 | | 1102 | TR18 | LDP | 12 | |
| 0013 | 01111100 | | 1103 | | ALEC | 3 | |
| 0026 | 10101100 | 1838 | 1104 | | BRNC | TR23 | |
| 000C | 01100010 | | 1105 | | CMIY | 4 | |
| 0019 | 01101000 | | 1106 | | CMIY | 1 | |
| 0032 | 00010100 | | 1107 | | LDP | 2 | |
| 0025 | 01110010 | | 1108 | | ALEC | 4 | |
| 000A | 10000011 | 1178 | 1109 | | BRNC | LU= | |

| PC | INST | BRLN | LINE | NAME | SOURCE STATEMENT TITLE | COMMENTS | |
|---|---|---|---|---|---|---|---|
| 0015 | 10100011 | 1211 | 1110 | | BRNC | LUNA | BET |
| | | | 1111 | | PAGE | 1 | |
| 0000 | 01000101 | | 1112 | SRONE | TRCY | 10 | |
| 0001 | 00111111 | | 1113 | | CLA | | |
| 0003 | 00111110 | | 1114 | Q2 | EXMA | | |
| 0007 | 00111100 | | 1115 | | DCY | | |
| 000F | 10000011 | 1114 | 1116 | | BRNC | Q2 | |
| 001F | 00001111 | | 1117 | | RETN | | |
| 003F | 00010101 | | 1118 | | LDP | 10 | |
| 003E | 11000000 | 1689 | 1119 | | CALL | DECDP1 | |
| 003D | 00011011 | | 1120 | Q3 | LDP | 13 | |
| 003B | 10110011 | 1895 | 1121 | | BRNC | B+ | |
| 0037 | 00001011 | | 1122 | INCDP1 | COMCP | | |
| 002F | 00010110 | | 1123 | | LDP | 6 | |
| 001E | 11010110 | 0923 | 1124 | | CALL | SL | |
| 003C | 00010110 | | 1125 | | LDP | 6 | |
| 0039 | 11001011 | 0430 | 1126 | | CALL | INCDP | |
| 0033 | 00001011 | | 1127 | | COMCP | | |
| 0027 | 10111101 | 1120 | 1128 | | BRNC | Q3 | |
| 000F | 00100001 | | 1129 | DOT5 | TRMA | | |
| 001C | 00101110 | | 1130 | | LDX | F | |
| 003A | 01111010 | | 1131 | | ALEC | 5 | |
| 0035 | 10101100 | 1135 | 1132 | | BRNC | P14 | |
| 002B | 01001000 | | 1133 | | TRCY | 1 | |
| 0016 | 10100001 | 1138 | 1134 | | BRNC | P15 | BET |
| 002C | 01000000 | | 1135 | P14 | TRCY | 0 | |
| 0018 | 00000100 | | 1136 | | A2AA | | |
| 0030 | 00000100 | | 1137 | | A2AA | | |
| 0021 | 01111110 | | 1138 | P15 | ALEC | 7 | |
| 0002 | 10111000 | 1145 | 1139 | | BRNC | P16 | |
| 0005 | 01110001 | | 1140 | | ALEC | 8 | |
| 0009 | 10011010 | 1153 | 1141 | | BRNC | P18 | |
| 0017 | 00111011 | | 1142 | | TRIT | 3 | |
| 002F | 10100100 | 1157 | 1143 | | BRNC | DT5 | |
| 001C | 10010010 | 1156 | 1144 | | BRNC | CLACC | BET |
| 0038 | 01110110 | | 1145 | P16 | ALEC | 6 | |
| 0031 | 10011011 | 1150 | 1146 | | BRNC | P17 | |
| 0023 | 00111010 | | 1147 | | TRIT | 1 | |
| 0006 | 10100100 | 1157 | 1148 | | BRNC | DT5 | |
| 000D | 10010010 | 1156 | 1149 | | BRNC | CLACC | BET |
| 001B | 00111000 | | 1150 | P17 | TRIT | 0 | |
| 0036 | 10100100 | 1157 | 1151 | | BRNC | DT5 | |
| 002D | 10010010 | 1156 | 1152 | | BRNC | CLACC | |
| 001A | 00111001 | | 1153 | P18 | TRIT | 2 | |
| 0034 | 10100100 | 1157 | 1154 | | BRNC | DT5 | |
| 0029 | 10010010 | 1156 | 1155 | | BRNC | CLACC | BET |
| 0012 | 00111111 | | 1156 | CLACC | CLA | | |
| 0024 | 00101100 | | 1157 | DT5 | LDX | B | |
| 0008 | 01000011 | | 1158 | | TRCY | 12 | |
| 0011 | 00100010 | | 1159 | | TRMY | | |
| 0022 | 01110000 | | 1160 | | ALEC | 0 | |
| 0004 | 10010011 | 1163 | 1161 | | BRNC | P19 | |
| 0009 | 00110000 | | 1162 | | SHIT | 0 | |
| 0013 | 00011110 | | 1163 | P19 | LDP | 7 | |
| 0026 | 10111001 | 1509 | 1164 | | BRNC | BRTN | BET |
| 000C | 01100111 | | 1165 | LUD | CMIY | 14 | |
| 0019 | 01101100 | | 1166 | | CMIY | 3 | |
| 0032 | 01101111 | | 1167 | | CMIY | 15 | |
| 0025 | 01100010 | | 1168 | | CMIY | 4 | |
| 000A | 01100010 | | 1169 | | CMIY | 4 | |
| 0015 | 01100010 | | 1170 | | CMIY | 4 | |
| 002A | 01100010 | | 1171 | | CMIY | 4 | |
| 0014 | 01100010 | | 1172 | | CMIY | 4 | |
| 0028 | 00010100 | | 1173 | | LDP | 2 | |
| 0010 | 10011111 | 1181 | 1174 | | BRNC | LU=1 | |
| | | | 1175 | | PAGE | 2 | |
| 0000 | 00011110 | | 1176 | EXIT | LDP | 7 | |
| 0001 | 10000000 | 1495 | 1177 | | BRNC | LOOKUPR | |
| 0003 | 01000010 | | 1178 | LU= | TRCY | 4 | |
| 0007 | 01101111 | | 1179 | | CMIY | 15 | |
| 000F | 01000110 | | 1180 | | TRCY | 6 | |
| 001F | 01101111 | | 1181 | LU=1 | CMIY | 15 | |
| 003F | 10000000 | 1176 | 1182 | | BRNC | EXIT | |

| PC | INST | BRLN | LINE | NAME | TITLE | COMMENTS | |
|---|---|---|---|---|---|---|---|
| 003E | 01100000 | | 1183 | LUT | CMIY | 0 | |
| 003D | 01100010 | | 1184 | LUT1 | CMIY | 4 | |
| 003B | 01100100 | | 1185 | | CMIY | 2 | |
| 0037 | 01100100 | | 1186 | | CMIY | 2 | |
| 002F | 01100100 | | 1187 | | CMIY | 2 | |
| 001F | 01100100 | | 1188 | | CMIY | 2 | |
| 003C | 01100100 | | 1189 | | CMIY | 2 | |
| 0039 | 01100100 | | 1190 | | CMIY | 2 | |
| 0033 | 10011111 | 1181 | 1191 | | BRNC | LU=1 | |
| 0027 | 01100110 | | 1192 | LUGT | CMIY | 6 | |
| 000E | 01100100 | | 1193 | | CMIY | 2 | |
| 001D | 01101110 | | 1194 | | CMIY | 7 | |
| 003A | 01100001 | | 1195 | | CMIY | 8 | |
| 0035 | 01101101 | | 1196 | | CMIY | 11 | |
| 0028 | 01100001 | | 1197 | | CMIY | 8 | |
| 0016 | 01100001 | | 1198 | | CMIY | 8 | |
| 002C | 01100001 | | 1199 | | CMIY | 8 | |
| 001B | 01101110 | | 1200 | | CMIY | 7 | |
| 0030 | 10000000 | 1176 | 1201 | | BRNC | EXIT | RET |
| 0021 | 00101100 | | 1202 | LUE/NA | LDX | 8 | |
| 0002 | 01000011 | | 1203 | | TRCY | 12 | |
| 0005 | 00100001 | | 1204 | | TRMA | | |
| 000B | 00101110 | | 1205 | | LDX | F | |
| 0017 | 01000000 | | 1206 | | TRCY | 0 | |
| 002E | 00010011 | | 1207 | | LDP | 12 | |
| 001C | 01110101 | | 1208 | | ALEC | 10 | |
| 0038 | 10000000 | 1515 | 1209 | | BRNC | LUE | |
| 0031 | 00010100 | | 1210 | | LDP | 2 | |
| 0023 | 01100010 | | 1211 | LUNA | CMIY | 4 | |
| 0006 | 01101000 | | 1212 | | CMIY | 1 | |
| 000D | 01101010 | | 1213 | | CMIY | 5 | |
| 0018 | 01101010 | | 1214 | | CMIY | 5 | |
| 0036 | 01101111 | | 1215 | | CMIY | 15 | |
| 0020 | 01101010 | | 1216 | | CMIY | 5 | |
| 001A | 01101111 | | 1217 | | CMIY | 15 | |
| 0034 | 01101010 | | 1218 | | CMIY | 5 | |
| 0029 | 01101010 | | 1219 | | CMIY | 5 | |
| 0012 | 10000000 | 1176 | 1220 | | BRNC | EXIT | |
| 0024 | 01100100 | | 1221 | LUX | CMIY | 2 | |
| 0008 | 01100100 | | 1222 | | CMIY | 2 | |
| 0011 | 01100000 | | 1223 | | CMIY | 0 | |
| 0022 | 01100001 | | 1224 | | CMIY | 8 | |
| 0004 | 01101010 | | 1225 | | CMIY | 5 | |
| 0009 | 01100100 | | 1226 | | CMIY | 2 | |
| 0013 | 01101010 | | 1227 | | CMIY | 5 | |
| 0026 | 01100001 | | 1228 | | CMIY | 8 | |
| 000C | 10000000 | 1176 | 1229 | | BRNC | EXIT | |
| 0019 | 01001011 | | 1230 | BURN | TRCY | 13 | |
| 0032 | 00010111 | | 1231 | | LDP | 14 | |
| 0025 | 10000000 | 1943 | 1232 | | BRNC | BURN1 | |
| 000A | 10111111 | | 1233 | TR3A | CLA | | |
| 0015 | 00010000 | | 1234 | | BL | TR3 | RET |
| 002A | 10111110 | 1059 | 1235 | | | | |
| | | | 1236 | | PAGE | 3 | |
| 0000 | 01111011 | | 1237 | NUM | ALEC | 13 | |
| 0001 | 10011111 | 1242 | 1238 | | BRNC | TR12 | |
| 0003 | 00000100 | | 1239 | | A2AA | | |
| 0007 | 00010000 | | 1240 | | LDP | 0 | |
| 000F | 10111110 | 1059 | 1241 | | BRNC | TR3 | RET |
| 001F | 01100110 | | 1242 | TR12 | CMIY | 6 | |
| 003F | 01101100 | | 1243 | | CMIY | 3 | |
| 003E | 01101110 | | 1244 | | CMIY | 7 | |
| 003D | 01100001 | | 1245 | | CMIY | 8 | |
| 003B | 01100001 | | 1246 | | CMIY | 8 | |
| 0037 | 01000000 | | 1247 | | TRCY | 0 | |
| 002F | 01111110 | | 1248 | TR5 | ALEC | 7 | |
| 001E | 10100011 | 1272 | 1249 | | BRNC | TR10 | |
| 003C | 01111001 | | 1250 | TR6 | ALEC | 9 | |
| 0039 | 10010110 | 1259 | 1251 | | BRNC | TR14 | |
| 0033 | 01111101 | | 1252 | | ALEC | 11 | |
| 0027 | 10010111 | 1267 | 1253 | | BRNC | TR16 | |
| 000E | 00010100 | | 1254 | | LDP | 2 | |
| 001D | 01110011 | | 1255 | | ALEC | 12 | |

| PC | INST | BRLN | LINE | NAME | SOURCE STATEMENT TITLE | COMMENTS | |
|---|---|---|---|---|---|---|---|
| 003A | 10100001 | 1202 | 1256 | | BRNC | LUE/NA | |
| 0035 | 00010011 | | 1257 | | BL | LUR | BET |
| 002B | 10001110 | 1832 | 1258 | | | | |
| 0016 | 01110001 | | 1259 | TR14 | ALEC | 8 | |
| 002C | 10100001 | 1263 | 1260 | | BRNC | TR15 | |
| 0018 | 00011010 | | 1261 | | LDP | 5 | |
| 0030 | 10100001 | 1392 | 1262 | | BRNC | LU9 | BET |
| 0021 | 01001010 | | 1263 | TR15 | TRCY | 5 | |
| 0002 | 01001010 | | 1264 | | TRCY | 5 | |
| 0005 | 00011010 | | 1265 | | LDP | 5 | |
| 000B | 10101110 | 1397 | 1266 | | BRNC | LU8 | BET |
| 0017 | 00011010 | | 1267 | TR16 | LDP | 5 | |
| 002E | 01110101 | | 1268 | | ALEC | 10 | |
| 001C | 10011001 | 1420 | 1269 | | BRNC | LUDP | |
| 0038 | 00010100 | | 1270 | | BL | TR3A | BET |
| 0031 | 10001010 | 1233 | 1271 | | | | |
| 0023 | 01111100 | | 1272 | TR10 | ALEC | 3 | |
| 0006 | 10011001 | 1291 | 1273 | | BRNC | TR11 | |
| 000D | 01111010 | | 1274 | | ALEC | 5 | |
| 001B | 10001001 | 1287 | 1275 | | BRNC | TR13 | |
| 0036 | 00010011 | | 1276 | | LDP | 12 | |
| 002D | 01110110 | | 1277 | | ALEC | 6 | |
| 001A | 10011001 | 1869 | 1278 | | BRNC | LU6 | |
| 0034 | 01100000 | | 1279 | LU7 | CMIY | 0 | |
| 0029 | 01100110 | | 1280 | | CMIY | 6 | |
| 0012 | 01100010 | | 1281 | | CMIY | 4 | |
| 0024 | 01100010 | | 1282 | | CMIY | 4 | |
| 0008 | 01100010 | | 1283 | | CMIY | 4 | |
| 0011 | 01100100 | | 1284 | | CMIY | 2 | |
| 0022 | 01101000 | | 1285 | | CMIY | 1 | |
| 0004 | 10111001 | 1829 | 1286 | | BRNC | LU5A | |
| 0009 | 00010011 | | 1287 | TR13 | LDP | 12 | |
| 0013 | 01110010 | | 1288 | | ALEC | 4 | |
| 0026 | 10010010 | 1859 | 1289 | | BRNC | LU4 | |
| 000C | 10110111 | 1825 | 1290 | | BRNC | LU5 | BET |
| 0019 | 01111000 | | 1291 | TR11 | ALEC | 1 | |
| 0032 | 10010100 | 1297 | 1292 | | BRNC | TR12A | |
| 0025 | 00011010 | | 1293 | | LDP | 5 | |
| 000A | 01110100 | | 1294 | | ALEC | 2 | |
| 0015 | 10111101 | 1374 | 1295 | | BRNC | LU2 | |
| 002A | 10110011 | 1381 | 1296 | | BRNC | LU3 | BET |
| 0014 | 00011010 | | 1297 | TR12A | LDP | 5 | |
| 0028 | 01110000 | | 1298 | | ALEC | 0 | |
| 0010 | 10000000 | 1366 | 1299 | | BRNC | LU0 | |
| 0020 | 10101001 | 1409 | 1300 | | BRNC | LU1 | BET |
| | | | 1301 | | PAGE | 4 | |
| 0000 | 01000000 | | 1302 | L28A | TRCY | 0 | |
| 0001 | 00100110 | | 1303 | | MNEO | | |
| 0003 | 10111111 | 1308 | 1304 | | BRNC | PR8 | |
| 0007 | 01001101 | | 1305 | | TRCY | 11 | |
| 000F | 00100110 | | 1306 | | MNEO | | |
| 001F | 10111010 | 1321 | 1307 | | BRNC | L25 | |
| 003F | 01000011 | | 1308 | PR8 | TRCY | 12 | |
| 003E | 00010011 | | 1309 | | LDP | 12 | |
| 003D | 00001011 | | 1310 | | COMCP | | |
| 003B | 00111011 | | 1311 | | TBIT | 3 | |
| 0037 | 10001101 | 0827 | 1312 | | BRNC | ZERO | |
| 002F | 10000000 | 0790 | 1313 | | BRNC | ZEROBAR | BET |
| 001E | 01000011 | | 1314 | PR | TRCY | 12 | |
| 003C | 00111000 | | 1315 | | TBIT | 0 | |
| 0039 | 10111010 | 1321 | 1316 | | BRNC | L25 | |
| 0033 | 01001101 | | 1317 | | TRCY | 11 | |
| 0027 | 00100001 | | 1318 | | TRMA | | |
| 000E | 01111101 | | 1319 | | ALEC | 11 | |
| 001D | 10011000 | 1326 | 1320 | | BRNC | L27 | |
| 003A | 00011000 | | 1321 | L25 | LDP | 1 | |
| 0035 | 11000000 | 1112 | 1322 | | CALL | SRONE | |
| 002B | 00010101 | | 1323 | | LDP | 10 | |
| 0016 | 11000000 | 1689 | 1324 | | CALL | DECDP1 | |
| 002C | 10011110 | 1314 | 1325 | | BRNC | PR | |
| 0018 | 01110101 | | 1326 | L27 | ALEC | 10 | |
| 0030 | 10011010 | 1343 | 1327 | | BRNC | L28 | |
| 0021 | 01000000 | | 1328 | ROUND | TRCY | 0 | |

| PC | INST | BRLN | LINE | NAME | SOURCE STATEMENT TITLE | COMMENTS |
|---|---|---|---|---|---|---|
| 0002 | 00100001 | | 1329 | | TRMA | |
| 0005 | 01110010 | | 1330 | | ALEC | 4 |
| 000B | 10111010 | 1321 | 1331 | | BRNC | L25 |
| 0017 | 01100000 | | 1332 | L34 | CMIY | 0 |
| 002E | 00000010 | | 1333 | | INMA | |
| 001C | 00000011 | | 1334 | | STA | |
| 0038 | 01111001 | | 1335 | | ALEC | 9 |
| 0031 | 10111010 | 1321 | 1336 | | BRNC | L25 |
| 0023 | 01010101 | | 1337 | | YNEC | 10 |
| 0006 | 10010111 | 1332 | 1338 | | BRNC | L34 |
| 000D | 01101000 | | 1339 | | CMIY | 1 |
| 001B | 00010101 | | 1340 | L39 | LDP | 10 |
| 0036 | 11000000 | 1689 | 1341 | | CALL | DECDP1 |
| 002D | 10111010 | 1321 | 1342 | | BRNC | L25 |
| 001A | 01000101 | | 1343 | L28 | TRCY | 10 |
| 0034 | 00100110 | | 1344 | | MNEO | |
| 0029 | 10110010 | 1357 | 1345 | | BRNC | RD |
| 0012 | 01000011 | | 1346 | | TRCY | 12 |
| 0024 | 00111011 | | 1347 | | TBIT | 3 |
| 0008 | 10101010 | 1361 | 1348 | | BRNC | LOOPB |
| 0011 | 01001111 | | 1349 | LOOPE | TRCY | 15 |
| 0022 | 00101001 | | 1350 | | LDX | A |
| 0004 | 00111001 | | 1351 | | TBIT | 2 |
| 0009 | 10111111 | 1308 | 1352 | | BRNC | PR8 |
| 0013 | 00111011 | | 1353 | | TBIT | 3 |
| 0026 | 10000000 | 1302 | 1354 | | BRNC | L28A |
| 000C | 00011001 | | 1355 | | LDP | 9 |
| 0019 | 10110101 | 1645 | 1356 | | BRNC | CD1A |
| 0032 | 01000011 | | 1357 | RD | TRCY | 12 |
| 0025 | 00111011 | | 1358 | | TBIT | 3 |
| 000A | 10111010 | 1321 | 1359 | | BRNC | L25 |
| 0015 | 10100001 | 1328 | 1360 | | BRNC | ROUND |
| 002A | 01001001 | | 1361 | LOOPB | TRCY | 9 |
| 0014 | 00100110 | | 1362 | | MNEO | |
| 0028 | 10100001 | 1328 | 1363 | | BRNC | ROUND |
| 0010 | 10010001 | 1349 | 1364 | | BRNC | LOOPE |
| | | | 1365 | | PAGE | 5 |
| 0000 | 01101111 | | 1366 | LU0 | CMIY | 14 |
| 0001 | 01001010 | | 1367 | LU0A | TRCY | 5 |
| 0003 | 01100001 | | 1368 | LU0D | CMIY | 8 |
| 0007 | 01100001 | | 1369 | LU0B | CMIY | 8 |
| 000F | 01100001 | | 1370 | LU0C | CMIY | 8 |
| 001F | 00001111 | | 1371 | | RETN | |
| 003F | 01101110 | | 1372 | | CMIY | 7 |
| 003E | 10100110 | 1418 | 1373 | | BRNC | OUT |
| 003D | 01101000 | | 1374 | LU2 | CMIY | 1 |
| 003B | 01101100 | | 1375 | | CMIY | 3 |
| 0037 | 01101111 | | 1376 | | CMIY | 15 |
| 002F | 01100001 | | 1377 | | CMIY | 8 |
| 001E | 01100010 | | 1378 | | CMIY | 4 |
| 003C | 01101100 | | 1379 | | CMIY | 3 |
| 0039 | 10011101 | 1384 | 1380 | | BRNC | LU3A |
| 0033 | 01000010 | | 1381 | LU3 | TRCY | 4 |
| 0027 | 01100000 | | 1382 | | CMIY | 0 |
| 000E | 01101100 | | 1383 | | CMIY | 3 |
| 001D | 01100000 | | 1384 | LU3A | CMIY | 0 |
| 003A | 10001111 | 1370 | 1385 | | BRNC | LU0C |
| 0035 | 01100100 | | 1386 | LUC | CMIY | 2 |
| 002B | 01100100 | | 1387 | | CMIY | 2 |
| 0016 | 01101110 | | 1388 | | CMIY | 7 |
| 002C | 01100001 | | 1389 | | CMIY | 8 |
| 0018 | 01100001 | | 1390 | | CMIY | 8 |
| 0030 | 10000011 | 1368 | 1391 | | BRNC | LU0D |
| 0021 | 01100011 | | 1392 | LU9 | CMIY | 12 |
| 0002 | 01101100 | | 1393 | | CMIY | 3 |
| 0005 | 01100110 | | 1394 | | CMIY | 6 |
| 000B | 01101000 | | 1395 | | CMIY | 1 |
| 0017 | 01100000 | | 1396 | LU9A | CMIY | 0 |
| 002E | 01001010 | | 1397 | LUB | TRCY | 5 |
| 001C | 01101110 | | 1398 | | CMIY | 7 |
| 0038 | 10001111 | 1369 | 1399 | | BRNC | LU0B |
| 0031 | 01000000 | | 1400 | LUA | TRCY | 0 |
| 0023 | 01101111 | | 1401 | | CMIY | 15 |

| PC | INST | BRLN | LINE | NAME | SOURCE STATEMENT TITLE | COMMENTS | |
|---|---|---|---|---|---|---|---|
| 0006 | 01101100 | | 1402 | | CMIY | 3 | |
| 000D | 11000011 | 1368 | 1403 | | CALL | LU0D | |
| 0016 | 01101111 | | 1404 | | CMIY | 15 | |
| 0036 | 10000111 | 1369 | 1405 | | BRNC | LU0B | |
| 002D | 01101110 | | 1406 | LU5 | CMIY | 7 | |
| 001A | 01101001 | | 1407 | | CMIY | 8 | |
| 0034 | 10101110 | 1397 | 1408 | | BRNC | LUB | |
| 0029 | 01100000 | | 1409 | LU1 | CMIY | 0 | |
| 0012 | 01100000 | | 1410 | | CMIY | 0 | |
| 0024 | 01101110 | | 1411 | | CMIY | 7 | |
| 0008 | 01100100 | | 1412 | LU1A | CMIY | 2 | |
| 0011 | 01100100 | | 1413 | | CMIY | 2 | |
| 0022 | 01100100 | | 1414 | | CMIY | 2 | |
| 0004 | 01100100 | | 1415 | | CMIY | 2 | |
| 0009 | 01100110 | | 1416 | | CMIY | 6 | |
| 0013 | 01100100 | | 1417 | | CMIY | 2 | |
| 0026 | 00011110 | | 1418 | OUT | LDP | 7 | |
| 000C | 10000000 | 1495 | 1419 | | BRNC | LOOKUPR | |
| 0019 | 01100000 | | 1420 | LUOP | CMIY | 0 | |
| 0032 | 01100000 | | 1421 | | CMIY | 0 | |
| 0025 | 01100110 | | 1422 | | CMIY | 6 | |
| 000A | 01100110 | | 1423 | | CMIY | 6 | |
| 0015 | 01100000 | | 1424 | | CMIY | 0 | |
| 002A | 01100000 | | 1425 | | CMIY | 0 | |
| 0014 | 01100000 | | 1426 | | CMIY | 0 | |
| 0028 | 01100000 | | 1427 | | CMIY | 0 | |
| 0010 | 01100000 | | 1428 | | CMIY | 0 | |
| 0020 | 10100110 | 1418 | 1429 | | BRNC | OUT | |
| | | | 1430 | | PAGE | 6 | |
| 0000 | 01100001 | | 1431 | PRINT | CMIY | 8 | |
| 0001 | 01101111 | | 1432 | | CMIY | 15 | |
| 0003 | 00111101 | | 1433 | | BL | PADV2 | BET |
| 0007 | 10010010 | 1736 | 1434 | | | | |
| 000F | 01000011 | | 1435 | PR1 | TRCY | 12 | |
| 001F | 00101100 | | 1436 | | LDX | 8 | |
| 003F | 00000010 | | 1437 | | INMA | | |
| 003E | 00010000 | | 1438 | | LDP | 0 | |
| 003D | 00100000 | | 1439 | | STIN | | |
| 0039 | 01111101 | | 1440 | | ALEC | 11 | |
| 0037 | 10000000 | 1052 | 1441 | | BRNC | LOOKUP | |
| 002F | 00100001 | | 1442 | PR2 | TRMA | | |
| 001E | 00011101 | | 1443 | | LDP | 11 | |
| 003C | 01000011 | | 1444 | | TRCY | 12 | |
| 0039 | 01110010 | | 1445 | | ALEC | 4 | |
| 0033 | 10010101 | 1810 | 1446 | | BRNC | D12A | |
| 0027 | 00010110 | | 1447 | | LDP | 6 | |
| 000F | 01100000 | | 1448 | | CMIY | 0 | |
| 0010 | 01100010 | | 1449 | | CMIY | 4 | |
| 003A | 01001010 | | 1450 | PR3 | TRCY | 5 | |
| 0035 | 00100011 | | 1451 | P3 | TRYA | | |
| 002B | 00000001 | | 1452 | | YNEA | | |
| 0016 | 01001111 | | 1453 | | TRCY | 15 | |
| 002C | 00101100 | | 1454 | | LDX | 8 | |
| 0018 | 00100010 | | 1455 | | TRMY | | |
| 0030 | 00000101 | | 1456 | P1 | INY | | |
| 0021 | 00111011 | | 1457 | | TBIT | 3 | |
| 0002 | 10110001 | 1465 | 1458 | | BRNC | P2 | |
| 0005 | 01011101 | | 1459 | | YNEC | 11 | |
| 000B | 10110000 | 1456 | 1460 | | BRNC | P1 | |
| 0017 | 01110010 | | 1461 | | ALEC | 4 | |
| 002E | 10011010 | 1472 | 1462 | | BRNC | P4A | |
| 001C | 01001111 | | 1463 | P5 | TRCY | 15 | |
| 0038 | 10000100 | 1480 | 1464 | | BRNC | PADV1 | BET |
| 0031 | 00001101 | | 1465 | P2 | SETR | | |
| 0023 | 01011101 | | 1466 | | YNEC | 11 | |
| 0006 | 10111110 | 1470 | 1467 | | BRNC | P6 | |
| 000D | 00000001 | | 1468 | | YNEA | | |
| 001B | 10011010 | 1472 | 1469 | | BRNC | P4A | BET |
| 0036 | 00000111 | | 1470 | P6 | DCA | | |
| 002D | 10110000 | 1456 | 1471 | | BRNC | P1 | |
| 001A | 00100011 | | 1472 | P4A | TRYA | | |
| 0034 | 01001111 | | 1473 | P4 | TRCY | 15 | |
| 0029 | 00000011 | | 1474 | | STA | | |
| 0012 | 00010100 | | 1475 | | LDP | 2 | |

| PC | INST | BRLN | LINE | NAME | SOURCE STATEMENT TITLE | COMMENTS | |
|---|---|---|---|---|---|---|---|
| 0024 | 10011001 | 1230 | 1476 | | BRNC | BURN | RET |
| 0008 | 00100001 | | 1477 | PAPADV | TRMA | | |
| 0011 | 01110101 | | 1478 | | ALEC | 10 | |
| 0022 | 10111010 | 1450 | 1479 | | BRNC | PR3 | |
| 0004 | 01101111 | | 1480 | PADV1 | CMIY | 15 | |
| 0009 | 00011101 | | 1481 | | LDP | 11 | |
| 0013 | 01001011 | | 1482 | | TRCY | 13 | |
| 0026 | 00000000 | | 1483 | | DCMA | | |
| 000C | 10000100 | 1301 | 1484 | | BRNC | D12 | |
| 0019 | 01101010 | | 1485 | | CMIY | 5 | |
| 0032 | 00000000 | | 1486 | | DCMA | | |
| 0025 | 00010001 | | 1487 | | LDP | 8 | |
| 000A | 00100000 | | 1488 | | STIN | | |
| 0015 | 00101001 | | 1489 | | LDX | A | |
| 002A | 01111000 | | 1490 | | ALEC | 1 | |
| 0014 | 10000001 | 1561 | 1491 | | BRNC | DONE | |
| 0028 | 00011101 | | 1492 | | BL | PADV2 | |
| 0010 | 10010010 | 1796 | 1493 | | | | |
| | | | 1494 | | PAGE | 7 | |
| 0000 | 00101100 | | 1495 | LOOKUPR | LDX | 8 | |
| 0001 | 01001011 | | 1496 | | TRCY | 13 | |
| 0003 | 00100001 | | 1497 | | TRMA | | |
| 0007 | 01000111 | | 1498 | | TRCY | 14 | |
| 000F | 00011000 | | 1499 | | LDP | 1 | |
| 001F | 01110010 | | 1500 | | ALEC | 4 | |
| 003F | 10001110 | 1122 | 1501 | | BRNC | DOT5 | |
| 003E | 00100010 | | 1502 | | TRMY | | |
| 003D | 00101110 | | 1503 | | LDX | F | |
| 003B | 00100001 | | 1504 | | TRMA | | |
| 0037 | 00101100 | | 1505 | | LDX | 8 | |
| 002F | 01000011 | | 1506 | | TRCY | 12 | |
| 001E | 00100010 | | 1507 | | TRMY | | |
| 003C | 00000011 | | 1508 | | STA | | |
| 0039 | 01001011 | | 1509 | BRTN | TRCY | 13 | |
| 0033 | 00011110 | | 1510 | | LDP | 7 | |
| 0027 | 00100001 | | 1511 | | TRMA | | |
| 000E | 01000011 | | 1512 | | TRCY | 12 | |
| 001D | 00101110 | | 1513 | | LDX | F | |
| 003A | 00111001 | | 1514 | | TBIT | 2 | |
| 0035 | 10011100 | 1527 | 1515 | | BRNC | P9 | |
| 002B | 00101100 | | 1516 | | LDX | 8 | |
| 0016 | 00100010 | | 1517 | | TRMY | | |
| 002C | 00000101 | | 1518 | | INY | | |
| 0018 | 00101001 | | 1519 | LRL | LDX | A | |
| 0030 | 00100010 | | 1520 | | TRMY | | |
| 0021 | 00010110 | | 1521 | | LDP | 6 | |
| 0002 | 01010111 | | 1522 | | YNEC | 14 | |
| 0005 | 10001111 | 1435 | 1523 | | BRNC | PR1 | |
| 000B | 01001011 | | 1524 | | TRCY | 13 | |
| 0017 | 00101100 | | 1525 | | LDX | 8 | |
| 002F | 10101111 | 1442 | 1526 | | BRNC | PR2 | RET |
| 001E | 00101100 | | 1527 | P9 | LDX | 8 | |
| 003B | 01110010 | | 1528 | | ALEC | 4 | |
| 0031 | 10010001 | 1542 | 1529 | | BRNC | P10 | |
| 0023 | 00100010 | | 1530 | | TRMY | | |
| 0006 | 01011100 | | 1531 | | YNEC | 3 | |
| 000D | 10110100 | 1537 | 1532 | | BRNC | P11 | |
| 001B | 00111111 | | 1533 | | CLA | | |
| 0036 | 00000111 | | 1534 | | DCA | | |
| 002D | 00010001 | | 1535 | | LDP | 8 | |
| 001A | 10011001 | 1614 | 1536 | | BRNC | D5 | RET |
| 0034 | 00010110 | | 1537 | P11 | LDP | 6 | |
| 0029 | 01011110 | | 1538 | | YNEC | 7 | |
| 0012 | 10001111 | 1435 | 1539 | | BRNC | PR1 | |
| 0024 | 00010001 | | 1540 | | LDP | 8 | |
| 0008 | 10100010 | 1608 | 1541 | | BRNC | FEED | RET |
| 0011 | 00000010 | | 1542 | P10 | INMA | | |
| 0022 | 00000011 | | 1543 | | STA | | |
| 0004 | 00100100 | | 1544 | | TRAY | | |
| 0009 | 01010110 | | 1545 | | YNEC | 6 | |
| 0013 | 10001100 | 1548 | 1546 | | BRNC | P12 | |
| 0026 | 10100101 | 1551 | 1547 | | BRNC | P13 | RET |
| 000C | 00010000 | | 1548 | P12 | LDP | 0 | |

| PC | INST | BRLN | LINE | NAME | SOURCE STATEMENT TITLE | COMMENTS | |
|---|---|---|---|---|---|---|---|
| 0019 | 01010011 | | 1549 | | YNEC | 12 | |
| 0032 | 10000000 | 1052 | 1550 | | BRNC | LOOKUP | |
| 0025 | 00010111 | | 1551 | P13 | LDP | 14 | |
| 000A | 10011101 | 1961 | 1552 | | BRNC | BURNOUT | BET |
| 0015 | 00101100 | | 1553 | SETUP1 | LDX | 8 | |
| 002A | 01000011 | | 1554 | | TRCY | 12 | |
| 0014 | 01101111 | | 1555 | | CMIY | 15 | |
| 0028 | 01101010 | | 1556 | | CMIY | 5 | |
| 0010 | 00010110 | | 1557 | | LDP | 6 | |
| 0020 | 10000000 | 1431 | 1558 | | BRNC | PRINT | |
| | | | 1559 | | PAGE | 8 | |
| 0000 | 01100001 | | 1560 | CRUNCH | CMIY | 8 | |
| 0001 | 01001111 | | 1561 | DONE | TRCY | 15 | |
| 0003 | 00100011 | | 1562 | | TRYA | | |
| 0007 | 00111000 | | 1563 | | TBIT | 0 | |
| 000F | 10111111 | 1566 | 1564 | | BRNC | DN1 | |
| 001F | 00000110 | | 1565 | | AGAA | | |
| 003F | 00110100 | | 1566 | DN1 | RBIT | 0 | |
| 003E | 00101010 | | 1567 | | LDX | E | |
| 003D | 00000011 | | 1568 | DN2 | STA | | |
| 003B | 01111000 | | 1569 | | ALEC | 1 | |
| 0037 | 10100100 | 1605 | 1570 | | BRNC | BOUNCE | |
| 002E | 00011101 | | 1571 | | LDP | 11 | |
| 001E | 11110100 | 1794 | 1572 | | CALL | SCAN1 | |
| 003C | 01000110 | | 1573 | DN5 | TRCY | 6 | |
| 0039 | 11111010 | 1579 | 1574 | | CALL | POW1 | |
| 0033 | 00100011 | | 1575 | BOTHON | TRYA | | (15) |
| 0027 | 01000000 | | 1576 | | TRCY | 0 | |
| 000E | 11110101 | 1580 | 1577 | | CALL | POW2 | |
| 0010 | 01001110 | | 1578 | ONEDWN | TRCY | 7 | |
| 003A | 00100011 | | 1579 | POW1 | TRYA | | |
| 0035 | 00000001 | | 1580 | POW2 | YNEA | | |
| 002B | 00100100 | | 1581 | | TRAY | | NOP |
| 0016 | 00001010 | | 1582 | | LDO | | |
| 002C | 01000101 | | 1583 | MS4 | TRCY | 10 | |
| 0018 | 00100011 | | 1584 | | TRYA | | |
| 0030 | 01000001 | | 1585 | | TRCY | 8 | |
| 0021 | 00000111 | | 1586 | TIME | DCA | | |
| 0002 | 10100001 | 1586 | 1587 | | BRNC | TIME | |
| 0005 | 00111100 | | 1588 | | DCY | | |
| 000B | 10100001 | 1586 | 1589 | | BRNC | TIME | |
| 0017 | 00101010 | | 1590 | | LDX | E | |
| 002F | 00001111 | | 1591 | | RETN | | |
| 001C | 11111010 | 1579 | 1592 | | CALL | POW1 | |
| 003B | 00000000 | | 1593 | | OCMA | | |
| 0031 | 10111101 | 1568 | 1594 | | BRNC | DN2 | |
| 0023 | 00011101 | | 1595 | | LDP | 11 | |
| 0006 | 11110100 | 1794 | 1596 | | CALL | SCAN1 | |
| 000D | 01010111 | | 1597 | | YNEC | 14 | |
| 001B | 10011010 | 1601 | 1598 | | BRNC | DN3 | |
| 0036 | 00011001 | | 1599 | DN4 | LDP | 9 | |
| 002D | 10010011 | 1676 | 1600 | | BRNC | DISP6A | BET |
| 001A | 01000100 | | 1601 | DN3 | TRCY | 2 | |
| 0034 | 00100110 | | 1602 | | MNEO | | |
| 0029 | 10111110 | 1599 | 1603 | | BRNC | DN4 | |
| 0012 | 10111100 | 1573 | 1604 | | BRNC | DN5 | BET |
| 0024 | 00010010 | | 1605 | BOUNCE | LDP | 4 | |
| 0008 | 00001011 | | 1606 | | COMCP | | |
| 0011 | 10110010 | 0327 | 1607 | | BRNC | DISP | BET |
| 0022 | 11011101 | 1578 | 1608 | FEED | CALL | ONEDWN | |
| 0004 | 00101110 | | 1609 | | LDX | F | |
| 0009 | 01000011 | | 1610 | | TRCY | 12 | |
| 0013 | 01100000 | | 1611 | | CMIY | 0 | |
| 0026 | 01001111 | | 1612 | | TRCY | 15 | |
| 000C | 00100011 | | 1613 | D4 | TRYA | | |
| 0019 | 00000001 | | 1614 | D5 | YNEA | | |
| 0032 | 00001010 | | 1615 | | LDO | | |
| 0025 | 01001001 | | 1616 | | TRCY | 9 | |
| 000A | 00100011 | | 1617 | | TRYA | | |
| 0015 | 01000000 | | 1618 | | TRCY | 0 | |
| 002A | 11100001 | 1586 | 1619 | | CALL | TIME | |
| 0014 | 00010110 | | 1620 | | LDP | 6 | |
| 0028 | 10001111 | 1435 | 1621 | | BRNC | PR1 | BET |
| 0010 | 01000110 | | 1622 | FEED3 | TRCY | 6 | |

| PC | INST | BRLN | LINE | NAME | SOURCE STATEMENT TITLE | COMMENTS | |
|---|---|---|---|---|---|---|---|
| 0020 | 10001100 | 1613 | 1623 | | BRNC | D4 | BET |
| | | | 1624 | | PAGE | 9 | |
| 0000 | 01000000 | | 1625 | GHREG | TRCY | 0 | |
| 0001 | 00101111 | | 1626 | A911S | LDX | G | |
| 0003 | 00100001 | | 1627 | | TRMA | | |
| 0007 | 00101011 | | 1628 | | LDX | H | |
| 000F | 00111110 | | 1629 | | EXMA | | |
| 001F | 00101111 | | 1630 | | LDX | G | |
| 003F | 00100000 | | 1631 | | STIN | | |
| 003E | 01011011 | | 1632 | | YNEC | 13 | |
| 003D | 10000001 | 1626 | 1633 | | BRNC | A911S | |
| 003B | 00001111 | | 1634 | | RETN | | |
| 0037 | 00101011 | | 1635 | EHREG | LDX | H | |
| 002F | 01000000 | | 1636 | | TRCY | 0 | |
| 001E | 00100001 | | 1637 | NXD1A | TRMA | | |
| 003C | 00001001 | | 1638 | | COMX | | |
| 0039 | 00111110 | | 1639 | | EXMA | | |
| 0033 | 00001001 | | 1640 | | COMX | | |
| 0027 | 00100000 | | 1641 | | STIN | | |
| 000E | 01011011 | | 1642 | | YNEC | 13 | |
| 001C | 10011110 | 1637 | 1643 | | BRNC | NXD1A | |
| 0038 | 00001111 | | 1644 | | RETN | | |
| 0035 | 00010011 | | 1645 | CD1A | LDP | 12 | |
| 002B | 00001011 | | 1646 | | COMCP | | |
| 0016 | 11110011 | 0805 | 1647 | | CALL | AREGE | |
| 002C | 00001011 | | 1648 | | COMCP | | |
| 0018 | 00011111 | | 1649 | | LDP | 15 | |
| 0030 | 01001011 | | 1650 | | TRCY | 13 | |
| 0021 | 00101011 | | 1651 | | LOX | H | |
| 0002 | 00111010 | | 1652 | | TBIT | 1 | |
| 0005 | 10100100 | 2052 | 1653 | | BRNC | STORC | |
| 000B | 00001011 | | 1654 | | COMCP | | |
| 0017 | 00010101 | | 1655 | | LDP | 10 | |
| 002F | 10001000 | 0706 | 1656 | | BRNC | CHOP1 | |
| 001E | 01000000 | | 1657 | EFREG | TRCY | 0 | |
| 003B | 00101110 | | 1658 | | LDX | F | |
| 0031 | 00100001 | | 1659 | NXDA | TRMA | | |
| 0023 | 00101010 | | 1660 | | LDX | E | |
| 0006 | 00111110 | | 1661 | | EXMA | | |
| 000D | 00101110 | | 1662 | | LDX | F | |
| 001B | 00100000 | | 1663 | | STIN | | |
| 0036 | 01011011 | | 1664 | | YNEC | 13 | |
| 002D | 10110001 | 1659 | 1665 | | BRNC | NXDA | |
| 001A | 00101011 | | 1666 | | LDX | H | |
| 0034 | 00001111 | | 1667 | | RETN | | |
| 0029 | 01000000 | | 1668 | EREGA | TRCY | 0 | |
| 0012 | 00101010 | | 1669 | BMW | LDX | F | |
| 0024 | 00100001 | | 1670 | | TRMA | | |
| 0008 | 00101001 | | 1671 | | LDX | A | |
| 0011 | 00100000 | | 1672 | | STIN | | |
| 0022 | 01011011 | | 1673 | | YNEC | 13 | |
| 0004 | 10010010 | 1669 | 1674 | | BRNC | BMW | |
| 0009 | 00001111 | | 1675 | | RETN | | |
| 0013 | 00001011 | | 1676 | DISP6A | COMCP | | EREGA FALLS THR |
| 0026 | 00010111 | | 1677 | | BL | DISP6 | |
| 000C | 10111110 | 0927 | 1678 | | | | |
| 0019 | 01000000 | | 1679 | HREGA | TRCY | 0 | |
| 0032 | 00101011 | | 1680 | MGTC | LDX | H | |
| 0025 | 00100001 | | 1681 | | TRMA | | |
| 000A | 00101001 | | 1682 | | LDX | A | |
| 0015 | 00100000 | | 1683 | | STIN | | |
| 002A | 01011011 | | 1684 | | YNEC | 13 | |
| 0014 | 10110010 | 1680 | 1685 | | BRNC | MGTC | |
| 0028 | 01000111 | | 1686 | | TRCY | 14 | |
| 0010 | 00001111 | | 1687 | | HETN | | |
| | | | 1688 | | PAGE | 10 | |
| 0000 | 01001101 | | 1689 | DECDP1 | TRCY | 11 | |
| 0001 | 00000000 | | 1690 | D6 | DCMA | | |
| 0003 | 10101111 | 1700 | 1691 | | BRNC | D7 | |
| 0007 | 00000011 | | 1692 | | STA | | |
| 000F | 01000011 | | 1693 | | TRCY | 12 | |
| 001F | 00111000 | | 1694 | | TBIT | 0 | |
| 003E | 10000001 | 1690 | 1695 | | BRNC | D6 | |

| PC | INST | BRLN | LINE | NAME (SOURCE STATEMENT) | TITLE (SOURCE STATEMENT) | COMMENTS | |
|---|---|---|---|---|---|---|---|
| 003F | 01001011 | | 1696 | | TRCY | 13 | |
| 003D | 00101100 | | 1697 | | LDX | B | |
| 003B | 00110001 | | 1698 | | SBIT | 2 | |
| 0037 | 00001111 | | 1699 | | RETN | | |
| 002F | 00000011 | | 1700 | Q7 | STA | | |
| 001E | 00111111 | | 1701 | | CLA | | |
| 003C | 00001111 | | 1702 | | RETN | | |
| 0039 | 00011001 | | 1703 | A++ | LDP | 9 | |
| 0033 | 11011100 | 1657 | 1704 | | CALL | EFREG | |
| 0027 | 00100001 | | 1705 | | TRMA | | |
| 000E | 00101110 | | 1706 | | LDX | F | |
| 001D | 00111001 | | 1707 | | TBIT | 2 | |
| 003A | 10111000 | 1722 | 1708 | | BRNC | MEMORY | |
| 0035 | 00101101 | | 1709 | | LDX | C | |
| 002B | 00111000 | | 1710 | | TBIT | 0 | |
| 0016 | 10101101 | 1729 | 1711 | | BRNC | C28 | |
| 002C | 00101001 | | 1712 | | LDX | A | |
| 0018 | 01000111 | | 1713 | | TRCY | 14 | |
| 0030 | 01111110 | | 1714 | | ALEC | 7 | |
| 0021 | 10001011 | 1718 | 1715 | | BRNC | C31 | |
| 0002 | 01101000 | | 1716 | | CMIY | 1 | |
| 0005 | 10010111 | 1719 | 1717 | | BRNC | C32 | |
| 000B | 01101100 | | 1718 | C31 | CMIY | 3 | |
| 0017 | 01100011 | | 1719 | C32 | CMIY | 12 | |
| 002E | 00011011 | | 1720 | C33 | LDP | 13 | |
| 001C | 10110011 | 1695 | 1721 | | BRNC | B+ | RET |
| 0038 | 00011001 | | 1722 | MEMORY | CALLL | GBREG | |
| 0031 | 11000000 | 1625 | 1723 | | | | |
| 0023 | 01000111 | | 1724 | | TRCY | 14 | |
| 0006 | 00101001 | | 1725 | | LDX | A | |
| 000D | 01101101 | | 1726 | | CMIY | 11 | |
| 001B | 01101011 | | 1727 | | CMIY | 13 | |
| 0036 | 10101110 | 1720 | 1728 | | BRNC | C33 | RET |
| 002D | 00110100 | | 1729 | C28 | RBIT | 0 | |
| 001A | 01000111 | | 1730 | | TRCY | 14 | |
| 0034 | 00101001 | | 1731 | | LDX | A | |
| 0029 | 01111110 | | 1732 | | ALEC | 7 | |
| 0012 | 10100110 | 1741 | 1733 | | BRNC | C29 | |
| 0024 | 01101011 | | 1734 | | CMIY | 13 | |
| 0008 | 01101011 | | 1735 | C30 | CMIY | 13 | |
| 0011 | 00011001 | | 1736 | | LDP | 9 | |
| 0022 | 11110111 | 1635 | 1737 | | CALL | EBREG | |
| 0004 | 00011001 | | 1738 | | LDP | 9 | |
| 0009 | 11101001 | 1668 | 1739 | | CALL | EREGA | |
| 0013 | 10101110 | 1720 | 1740 | | BRNC | C33 | |
| 0026 | 01101111 | | 1741 | C29 | CMIY | 15 | |
| 000C | 10001000 | 1735 | 1742 | | BRNC | C30 | |
| 0019 | 01000000 | | 1743 | PR4 | TRCY | 0 | |
| 0032 | 00100001 | | 1744 | P7 | TRMA | | |
| 0025 | 00100101 | | 1745 | | AMAA | | |
| 000A | 00100000 | | 1746 | | STIN | | |
| 0015 | 01010011 | | 1747 | | YNEC | 12 | |
| 002A | 10110010 | 1744 | 1748 | | BRNC | P7 | |
| 0014 | 00010110 | | 1749 | | BL | PR3 | RET |
| 0028 | 10111010 | 1450 | 1750 | | | | |
| | | | 1751 | | PAGE | 11 | |
| 0000 | 00111110 | | 1752 | BUFA | EXMA | | |
| 0001 | 00100111 | | 1753 | | SMAA | | |
| 0003 | 00100100 | | 1754 | | TRAY | | |
| 0007 | 01010000 | | 1755 | | YNEC | 0 | |
| 000F | 10101111 | 1763 | 1756 | | BRNC | B16A | |
| 001F | 01000111 | | 1757 | | TRCY | 14 | |
| 003F | 00100001 | | 1758 | | TRMA | | |
| 003E | 00101000 | | 1759 | | LDX | D | |
| 003D | 00100111 | | 1760 | | SMAA | | |
| 003B | 01110000 | | 1761 | | ALEC | 0 | |
| 0037 | 10111000 | 1785 | 1762 | | BRNC | B1 | |
| 002F | 00101000 | | 1763 | B16A | LDX | D | |
| 001E | 01000111 | | 1764 | B16 | TRCY | 14 | |
| 003C | 00100001 | | 1765 | | TRMA | | |
| 0039 | 01110000 | | 1766 | | ALEC | 0 | |
| 0033 | 10000110 | 1788 | 1767 | | BRNC | B20 | |
| 0027 | 00101111 | | 1768 | | LDX | G | |

| PC | INST | BRLN | LINE | NAME | SOURCE STATEMENT TITLE | COMMENTS | |
|---|---|---|---|---|---|---|---|
| 000F | 00000011 | | 1769 | H17 | STA | | |
| 0010 | 00101000 | | 1770 | | LDX | D | |
| 003A | 01001011 | | 1771 | | TRCY | 13 | |
| 0035 | 00100110 | | 1772 | | MNEO | | |
| 002B | 10000110 | 1788 | 1773 | | BRNC | H20 | |
| 0016 | 00100110 | | 1774 | H18 | MNEO | | |
| 002C | 10100001 | 1778 | 1775 | | BRNC | H19 | |
| 0018 | 00111100 | | 1776 | | DCY | | |
| 0030 | 10010110 | 1774 | 1777 | | BRNC | H18 | |
| 0021 | 00000101 | | 1778 | H19 | INY | | |
| 0002 | 00100000 | | 1779 | | STIM | | |
| 0005 | 00100011 | | 1780 | | TRYA | | |
| 000B | 01001111 | | 1781 | | TRCY | 15 | |
| 0017 | 00111110 | | 1782 | | EXMA | | |
| 002F | 00111000 | | 1783 | | TBIT | 0 | |
| 001C | 10001110 | 1769 | 1784 | | BRNC | H17 | |
| 0038 | 01000111 | | 1785 | H1 | TRCY | 14 | |
| 0031 | 01100000 | | 1786 | | CMIY | 0 | |
| 0023 | 01100000 | | 1787 | | CMIY | 0 | |
| 0006 | 00001111 | | 1788 | H20 | RETN | | |
| 000D | 00011000 | | 1789 | | LDP | 1 | |
| 001A | 00001011 | | 1790 | | COMCP | | |
| 0036 | 10100000 | 0077 | 1791 | | BRNC | NX1 | |
| 002D | 00010111 | | 1792 | DFEB | LDP | 14 | |
| 001A | 11101111 | 1954 | 1793 | | CALL | D7 | |
| 0034 | 00001011 | | 1794 | SCAN1 | COMCP | | |
| 0029 | 10000000 | 0725 | 1795 | | BRNC | SCAN | BET |
| 0012 | 00101110 | | 1796 | PADV2 | LDX | F | |
| 0024 | 01000011 | | 1797 | | TRCY | 12 | |
| 000B | 00110001 | | 1798 | | SBIT | 2 | |
| 0011 | 00010001 | | 1799 | | BL | FFED3 | BET |
| 0022 | 10010000 | 1622 | 1800 | | | | |
| 0004 | 00000011 | | 1801 | D12 | STA | | |
| 0009 | 00010101 | | 1802 | | LDP | 10 | |
| 0013 | 00100110 | | 1803 | | MNEO | | |
| 0026 | 10011001 | 1743 | 1804 | | BRNC | PR4 | |
| 000C | 01000011 | | 1805 | | TRCY | 12 | |
| 0019 | 00100001 | | 1806 | | TRMA | | |
| 0032 | 00010000 | | 1807 | | LDP | 0 | |
| 0025 | 01111101 | | 1808 | | ALEC | 11 | |
| 000A | 10000000 | 1052 | 1809 | | BRNC | LOOKUP | |
| 0015 | 01101111 | | 1810 | D12A | CMIY | 15 | |
| 002A | 01000000 | | 1811 | | TRCY | 0 | |
| 0014 | 00010111 | | 1812 | | LDP | 14 | |
| 0028 | 10001100 | 1996 | 1813 | | BRNC | PR4A | BET |
| | | | 1814 | | PAGE | 12 | |
| 0000 | 01101000 | | 1815 | LUE | CMIY | 1 | |
| 0001 | 01100010 | | 1816 | | CMIY | 4 | |
| 0003 | 01101111 | | 1817 | | CMIY | 15 | |
| 0007 | 01001010 | | 1818 | | TRCY | 5 | |
| 000F | 01101111 | | 1819 | LUE1 | CMIY | 15 | |
| 001F | 01100001 | | 1820 | | CMIY | 8 | |
| 003F | 01100001 | | 1821 | LUE2 | CMIY | 8 | |
| 003E | 01101111 | | 1822 | | CMIY | 15 | |
| 003D | 00011110 | | 1823 | OUT1 | LDP | 7 | |
| 003B | 10000000 | 1495 | 1824 | | BRNC | LOOKUPR | |
| 0037 | 01100111 | | 1825 | LU5 | CMIY | 14 | |
| 002F | 01100010 | | 1826 | | CMIY | 4 | |
| 001E | 01000010 | | 1827 | | TRCY | 4 | |
| 003C | 01100000 | | 1828 | | CMIY | 0 | |
| 0039 | 01100000 | | 1829 | LU5A | CMIY | 0 | |
| 0033 | 01101111 | | 1830 | | CMIY | 15 | |
| 0027 | 10111111 | 1821 | 1831 | | BRNC | LUE2 | |
| 000F | 01101000 | | 1832 | LUR | CMIY | 1 | |
| 001D | 01101100 | | 1833 | | CMIY | 3 | |
| 003A | 01100001 | | 1834 | | CMIY | 8 | |
| 0035 | 01101001 | | 1835 | | CMIY | 9 | |
| 002B | 01100101 | | 1836 | | CMIY | 10 | |
| 0016 | 10001111 | 1819 | 1837 | | BRNC | LUE1 | |
| 002C | 01110000 | | 1838 | TB23 | ALEC | 0 | |
| 0018 | 10011010 | 1856 | 1839 | | BRNC | BLANK | |
| 0030 | 01100001 | | 1840 | TB26 | CMIY | 8 | |
| 0021 | 01001010 | | 1841 | | TRCY | 5 | |

| PC | INST | BRLN | LINE | NAME | SOURCE STATEMENT TITLE | COMMENTS | |
|---|---|---|---|---|---|---|---|
| 0002 | 01101111 | | 1842 | | CMIY | 15 | |
| 0005 | 01111000 | | 1843 | TR28 | ALEC | 1 | |
| 0008 | 10110001 | 1849 | 1844 | | BRNC | TR24 | |
| 0017 | 01001110 | | 1845 | | TRCY | 7 | |
| 002F | 01100100 | | 1846 | | CMIY | 2 | |
| 001C | 01001100 | | 1847 | | TRCY | 3 | |
| 0038 | 01100100 | | 1848 | | CMIY | 2 | |
| 0031 | 01110100 | | 1849 | TR24 | ALEC | 2 | |
| 0023 | 10111110 | 1854 | 1850 | | BRNC | TR27 | |
| 0006 | 01100100 | | 1851 | | CMIY | 2 | |
| 000D | 01000110 | | 1852 | | TRCY | 6 | |
| 0019 | 01100100 | | 1853 | | CMIY | 2 | |
| 0036 | 00011110 | | 1854 | TR27 | LDP | 7 | |
| 0020 | 10000000 | 1495 | 1855 | | BRNC | LOOKUPR | RET |
| 001A | 00111111 | | 1856 | BLANK | CLA | | |
| 0034 | 00111111 | | 1857 | | CLA | | |
| 0029 | 10000101 | 1843 | 1858 | | BRNC | TR28 | RET |
| 0012 | 01100010 | | 1859 | LU4 | CMIY | 4 | |
| 0024 | 01100000 | | 1860 | | CMIY | 0 | |
| 0008 | 01101000 | | 1861 | | CMIY | 1 | |
| 0011 | 01101000 | | 1862 | | CMIY | 1 | |
| 0022 | 01101111 | | 1863 | | CMIY | 15 | |
| 0004 | 01101001 | | 1864 | | CMIY | 9 | |
| 0009 | 01101010 | | 1865 | | CMIY | 5 | |
| 0013 | 01101100 | | 1866 | | CMIY | 3 | |
| 0026 | 01101000 | | 1867 | | CMIY | 1 | |
| 000C | 10111101 | 1823 | 1868 | | BRNC | OUT1 | |
| 0019 | 01100110 | | 1869 | LU6 | CMIY | 6 | |
| 0032 | 01100000 | | 1870 | | CMIY | 0 | |
| 0025 | 01001010 | | 1871 | | TRCY | 5 | |
| 000A | 01101111 | | 1872 | | CMIY | 15 | |
| 0015 | 01100001 | | 1873 | | CMIY | 8 | |
| 002A | 01100010 | | 1874 | | CMIY | 4 | |
| 0014 | 01101100 | | 1875 | | CMIY | 3 | |
| 0028 | 10111101 | 1823 | 1876 | | BRNC | OUT1 | |
| 0010 | 00010010 | | 1877 | R06 | LDP | 4 | |
| 0020 | 10100001 | 1328 | 1878 | | BRNC | ROUND | |
| | | | 1879 | | PAGE | 13 | |
| 0000 | 00101001 | | 1880 | C12S | LDX | A | |
| 0001 | 01000011 | | 1881 | | TRCY | 12 | |
| 0003 | 00100001 | | 1882 | | TRMA | | |
| 0007 | 00101011 | | 1883 | | LDX | B | |
| 000F | 00100101 | | 1884 | | AMAA | | |
| 001F | 01001011 | | 1885 | | TRCY | 13 | |
| 003F | 00111011 | | 1886 | | TRIT | 3 | |
| 003E | 10111011 | 1889 | 1887 | | BRNC | C13 | |
| 003D | 10101111 | 1891 | 1888 | | BRNC | C14 | |
| 003B | 00000110 | | 1889 | C13 | A6AA | | |
| 0037 | 00000100 | | 1890 | | A2AA | | |
| 002F | 00110100 | | 1891 | C14 | RBIT | 0 | |
| 001F | 01111110 | | 1892 | | ALEC | 7 | |
| 003C | 10110011 | 1895 | 1893 | | BRNC | B+ | |
| 0039 | 00110000 | | 1894 | | SBIT | 0 | |
| 0033 | 00101001 | | 1895 | B+ | LDX | A | |
| 0027 | 01000011 | | 1896 | B+1 | TRCY | 12 | |
| 000E | 00111000 | | 1897 | | TBIT | 0 | |
| 001D | 10101001 | 1923 | 1898 | | BRNC | DDA | |
| 003A | 00101110 | | 1899 | | LDX | F | |
| 0035 | 01001111 | | 1900 | | TRCY | 15 | |
| 002B | 00111011 | | 1901 | | TBIT | 3 | |
| 0016 | 10000010 | 1907 | 1902 | | BRNC | C1S | |
| 002C | 00101001 | | 1903 | | LDX | A | |
| 0018 | 00110101 | | 1904 | | RBIT | 2 | |
| 0030 | 00010010 | | 1905 | | LDP | 4 | |
| 0021 | 10011110 | 1314 | 1906 | | BRNC | PR | |
| 0002 | 01000111 | | 1907 | C1S | TRCY | 14 | |
| 0005 | 00000010 | | 1908 | | INMA | | |
| 000B | 00101001 | | 1909 | | LDX | A | |
| 0017 | 01001101 | | 1910 | | TRCY | 11 | |
| 002F | 00100111 | | 1911 | | SMAA | | |
| 001C | 10011010 | 1921 | 1912 | | BRNC | C7S | |
| 0038 | 01000101 | | 1913 | C8S | TRCY | 10 | |
| 0031 | 00100110 | | 1914 | | MNEO | | |
| 0023 | 10100100 | 1925 | 1915 | | BRNC | R0 | |

| PC | INST | BRLN | LINE | NAME | SOURCE STATEMENT TITLE | COMMENTS | |
|---|---|---|---|---|---|---|---|
| 0006 | 01001001 | | 1916 | | TRCY | 9 | |
| 0009 | 00100110 | | 1917 | | MNEA | | |
| 0013 | 10010001 | 1927 | 1918 | | BRNC | C22 | |
| 0036 | 00011000 | | 1919 | WR | LDP | 1 | |
| 0020 | 10110111 | 1122 | 1920 | | BRNC | INCDP1 | |
| 001A | 01110000 | | 1921 | C7S | ALEC | 0 | |
| 0034 | 10100100 | 1925 | 1922 | | BRNC | RO | |
| 0029 | 00011000 | | 1923 | DDA | LDP | 1 | |
| 0012 | 10000000 | 1112 | 1924 | | BRNC | SRONE | |
| 0024 | 00010010 | | 1925 | RO | LDP | 4 | |
| 0008 | 10101001 | 1328 | 1926 | | BRNC | ROUND | |
| 0011 | 01000011 | | 1927 | C22 | TRCY | 12 | |
| 0022 | 00111011 | | 1928 | | TBIT | 3 | |
| 0004 | 10100100 | 1925 | 1929 | | BRNC | RO | |
| 0009 | 10110110 | 1919 | 1930 | | BRNC | WR | |
| 0013 | 01101100 | | 1931 | LUP | CMIY | 3 | |
| 0026 | 01100100 | | 1932 | | CMIY | 2 | |
| 000C | 01101000 | | 1933 | | CMIY | 1 | |
| 0019 | 01101001 | | 1934 | | CMIY | 9 | |
| 0032 | 01100010 | | 1935 | | CMIY | 4 | |
| 0025 | 01100100 | | 1936 | | CMIY | 2 | |
| 000A | 01101000 | | 1937 | | CMIY | 1 | |
| 0015 | 01100011 | | 1938 | | CMIY | 12 | |
| 002A | 01100011 | | 1939 | | CMIY | 12 | |
| 0014 | 00011110 | | 1940 | | LDP | 7 | |
| 0028 | 10000000 | 1495 | 1941 | | BRNC | LOOKUPR | |
| | | | 1942 | | PAGE | 14 | |
| 0000 | 00000010 | | 1943 | BURN1 | INMA | | |
| 0001 | 00001010 | | 1944 | | LDO | | |
| 0003 | 00100100 | | 1945 | | TRAY | | |
| 0007 | 00000001 | | 1946 | | YNEA | | |
| 000F | 01011010 | | 1947 | | YNEC | 5 | |
| 001F | 10111110 | 1950 | 1948 | | BRNC | D6 | |
| 003F | 10101111 | 1954 | 1949 | | BRNC | D7 | RET |
| 003E | 01000011 | | 1950 | D6 | TRCY | 12 | |
| 003D | 00101001 | | 1951 | | TRMA | | |
| 003B | 01111101 | | 1952 | | ALEC | 11 | |
| 0037 | 10010001 | 1990 | 1953 | | BRNC | DA | |
| 002F | 01000111 | | 1954 | D7 | TRCY | 14 | |
| 001E | 00100011 | | 1955 | TIME2 | TRYA | | |
| 003C | 00000111 | | 1956 | TIME1 | DCA | | |
| 0039 | 10111100 | 1956 | 1957 | | BRNC | TIME1 | |
| 0033 | 00111100 | | 1958 | | DCY | | |
| 0027 | 10111100 | 1956 | 1959 | | BRNC | TIME1 | |
| 000F | 00001111 | | 1960 | | RETN | | |
| 001D | 00101110 | | 1961 | BURNOUT | LDX | F | |
| 003A | 01000011 | | 1962 | | TRCY | 12 | |
| 0035 | 00110101 | | 1963 | | RBIT | 2 | |
| 002B | 01000100 | | 1964 | | TRCY | 2 | |
| 0016 | 11011110 | 1955 | 1965 | | CALL | TIME2 | |
| 002C | 01000000 | | 1966 | D9 | TRCY | 0 | |
| 0018 | 00001100 | | 1967 | OFF | RRINY | | |
| 0030 | 00001100 | | 1968 | | RRINY | | |
| 0021 | 00001100 | | 1969 | | RRINY | | |
| 0002 | 00001100 | | 1970 | | RRINY | | |
| 0005 | 00001100 | | 1971 | | RRINY | | |
| 000B | 00001100 | | 1972 | | RRINY | | |
| 0017 | 00001111 | | 1973 | | RETN | | |
| 002F | 11011000 | 1967 | 1974 | | CALL | OFF | |
| 001C | 00111111 | | 1975 | | CLA | | |
| 0038 | 00001010 | | 1976 | | LDO | | |
| 0031 | 11011000 | 1967 | 1977 | | CALL | OFF | |
| 0023 | 11011000 | 1967 | 1978 | | CALL | OFF | |
| 0006 | 01000011 | | 1979 | | TRCY | 12 | |
| 000D | 00101110 | | 1980 | | LDX | F | |
| 001B | 00111010 | | 1981 | | TBIT | 1 | |
| 0036 | 10010011 | 1994 | 1982 | | BRNC | D10 | |
| 002D | 00110010 | | 1983 | | SBIT | 1 | |
| 001A | 00011101 | | 1984 | | LDP | 11 | |
| 0034 | 11110100 | 1794 | 1985 | | CALL | SCAN1 | |
| 0029 | 00010110 | | 1986 | D11 | LDP | 6 | |
| 0012 | 00101100 | | 1987 | | LDX | 8 | |
| 0024 | 01001111 | | 1988 | | TRCY | 15 | |
| 0008 | 10001000 | 1477 | 1989 | | BRNC | PAPAOV | BET |

| PC | INST | BRLN | LINE | NAME | SOURCE STATEMENT TITLE | COMMENTS |
|---|---|---|---|---|---|---|
| 0011 | 00101110 | | 1990 | D8 | LDX | F |
| 0022 | 00110001 | | 1991 | | SBIT | 2 |
| 0004 | 00010000 | | 1992 | | LDP | 0 |
| 0009 | 10000000 | 1052 | 1993 | | BRNC | LOOKUP RET |
| 0013 | 00110110 | | 1994 | D10 | RBIT | 1 |
| 0026 | 10101001 | 1986 | 1995 | | BRNC | D11 |
| 000C | 00110111 | | 1996 | PR4A | RBIT | 3 |
| 0019 | 00100001 | | 1997 | | TRMA | |
| 0032 | 01110000 | | 1998 | | ALEC | 0 |
| 0025 | 10010101 | 2001 | 1999 | | BRNC | PB |
| 000A | 00110011 | | 2000 | | SBIT | 3 |
| 0015 | 00000101 | | 2001 | PB | INY | |
| 002A | 01010011 | | 2002 | | YNEC | 12 |
| 0014 | 10001100 | 1996 | 2003 | | BRNC | PR4A |
| 0028 | 00010110 | | 2004 | | LDP | 6 |
| 0010 | 10111010 | 1450 | 2005 | | BRNC | PR3 RET |
| | | | 2006 | | PAGE | 15 |
| 0000 | 00101101 | | 2007 | X/ | LDX | C |
| 0001 | 01001011 | | 2008 | | TRCY | 13 |
| 0003 | 00111001 | | 2009 | | TBIT | 2 |
| 0007 | 10101111 | 2018 | 2010 | | BRNC | A4 |
| 000F | 01111110 | | 2011 | | ALEC | 7 |
| 001F | 10001110 | 2024 | 2012 | | BRNC | A3 |
| 003F | 11001000 | 2053 | 2013 | | CALL | AREGC |
| 003E | 01100110 | | 2014 | | CMIY | 6 |
| 003D | 00101001 | | 2015 | | LDX | A |
| 003B | 01100100 | | 2016 | A1 | CMIY | 2 |
| 0037 | 10111000 | 2040 | 2017 | | BRNC | A2 |
| 002F | 00110011 | | 2018 | A4 | SBIT | 3 |
| 001E | 00101001 | | 2019 | | LDX | A |
| 003C | 01100001 | | 2020 | | CMIY | 8 |
| 0039 | 01111110 | | 2021 | | ALEC | 7 |
| 0033 | 10110101 | 2027 | 2022 | | BRNC | A5 |
| 0027 | 10111011 | 2016 | 2023 | | BRNC | A1 |
| 000E | 11001000 | 2053 | 2024 | A3 | CALL | AREGC TIMES KEY |
| 001D | 01100010 | | 2025 | | CMIY | 4 |
| 003A | 00101001 | | 2026 | | LDX | A |
| 0035 | 01100101 | | 2027 | A5 | CMIY | 10 |
| 002B | 10111000 | 2040 | 2028 | | BRNC | A2 |
| 0016 | 00101101 | | 2029 | P= | LDX | C |
| 002C | 01001011 | | 2030 | | TRCY | 13 |
| 0018 | 00111010 | | 2031 | | TBIT | 1 |
| 0030 | 10000101 | 2035 | 2032 | | BRNC | A6 |
| 0021 | 01111100 | | 2033 | | ALEC | 3 |
| 0002 | 10000110 | 2043 | 2034 | | BRNC | A7 |
| 0005 | 01111100 | | 2035 | A6 | ALEC | 3 |
| 000B | 10011010 | 2048 | 2036 | | BRNC | A8 |
| 0017 | 00101001 | | 2037 | MX | LDX | A |
| 002E | 01100001 | | 2038 | | CMIY | 8 |
| 001C | 01101010 | | 2039 | | CMIY | 4 |
| 0038 | 01100001 | | 2040 | A2 | CMIY | 8 |
| 0031 | 00010010 | | 2041 | | LDP | 4 |
| 0023 | 10011110 | 1314 | 2042 | | BRNC | PR |
| 0006 | 00110000 | | 2043 | A7 | SBIT | 0 |
| 000D | 00101001 | | 2044 | | LDX | A |
| 001B | 01100001 | | 2045 | | CMIY | 8 |
| 0036 | 01100011 | | 2046 | | CMIY | 12 |
| 002D | 10111000 | 2040 | 2047 | | BRNC | A2 |
| 001A | 01000111 | | 2048 | A8 | TRCY | 14 |
| 0034 | 00110000 | | 2049 | | SBIT | 0 |
| 0029 | 01001011 | | 2050 | | TRCY | 13 |
| 0012 | 10010111 | 2037 | 2051 | | BRNC | MX |
| 0024 | 00110110 | | 2052 | STORC | RBIT | 1 |
| 0008 | 01000000 | | 2053 | AREGC | TRCY | 0 |
| 0011 | 00101001 | | 2054 | C42 | LDX | A |
| 0022 | 00100001 | | 2055 | | TRMA | |
| 0004 | 00101101 | | 2056 | | LDX | C |
| 0009 | 01100000 | | 2057 | | STI | |
| 0013 | 01011011 | | 2058 | | YNEC | 13 |
| 0026 | 10010001 | 2054 | 2059 | | BRNC | C42 |
| 000C | 10101111 | | 2060 | | RET | |
| 0019 | 10101011 | | 2061 | CHAIN | COMCP | |
| 0032 | 10101110 | | 2062 | | LDX | B |
| 0025 | 10111011 | | 2063 | | TBIT | 2 |

| C | INST | BRLN | LINE | NAME | SOURCE STATEMENT TITLE | COMMENTS |
|---|---|---|---|---|---|---|
| A | [illegible] | [illegible] | 2064 | | [illegible] | ERROR |
| 5 | [illegible] | | 2065 | | [illegible] | DISP1 |
| A | [illegible] | [illegible] | 2066 | | | |
| | | | 2067 | | END | |

TABLE II

| INSTRUCTION CODE | MNEMONIC |
|---|---|
| 11 W | CALL* |
| 10 W | BRNC* |
| 0100 C | TRCY* |
| 0101 C | YNEC* |
| 0110 C | CMIY* |
| 0111 C | ALEC* |
| 0011 00 B | SBIT* |
| 0011 01 B | RBIT* |
| 0011 10 B | TBIT* |
| 0011 1100 | DCY* |
| 0011 1101 | CIA* |
| 0011 1110 | EXMA* |
| 0011 1111 | CLA* |
| 0010 0000 | STIN* |
| 0010 0001 | TRMA* |
| 0010 0010 | TRMY* |
| 0010 0011 | TRYA* |
| 0010 0100 | TRAY* |
| 0010 0101 | AMAA* |
| 0010 0110 | MNEO* |
| 0010 0111 | SMAA* |
| 0010 1 B | LDX* |
| 0001 C | LDP* |
| 0000 0000 | DCMA* |
| 0000 0001 | YNEA* |
| 0000 0010 | INMA* |
| 0000 0011 | STA* |
| 0000 0100 | A2AA** |
| 0000 0101 | INY* |
| 0000 0110 | A6AA* |
| 0000 0111 | DCA* |
| 0000 1000 | TRKA* |
| 0000 1001 | COMX* |
| 0000 1010 | LDO* |
| 0000 1011 | COMCP** |
| 0000 1100 | RRINY** |
| 0000 1101 | SETR* |
| 0000 1110 | KNEC* |
| 0000 1111 | RETN* |

* See U.S. Patent 3,988,604 for definition of instructions having these mnemonics.

**

1. A2AA = The constant two, as determined by bits R7 - R4 of the instruction word, is added to the contents of accomulator 52. Resulting carry information - same as A6AA instruction.

2. COMCP = Complement chapter latch.

3. RRINY = RSTR as defined in U.S. Patent 3,988,604, but the contents of the Y register 40 are also incremented after the reset.

is claimed is:

ıethod of performing a burn-in test of an elec- ›paratus having a keyboard and an output de- ıprising the steps of:

:oding an unusual sequence of key depressions aid keyboard, said unusual sequence being a ıence which would not be encountered during normal operation of said apparatus;

(b) loading an output register with data in response to the decoding of the unusual key sequence; and (c) repetitively transferring the data in said output register to said output device, whereby said burn-in test of said apparatus is accomplished.

2. The method according to claim 1, wherein the step of loading the output register includes loading the output register with a plurality of numeral eights.

3. The method according to claim 2, wherein said output device is a printer mechanism.

4. The method according to claim 3, wherein said printer mechanism is a thermal printer.

5. The method according to claim 1, wherein the step of repetitively transferring the data in the output register to the output device includes entering a wait mode between each time the data in the output register is transferred to the output device.

6. The method according to claim 5, wherein the apparatus when in its wait mode performs no observable function for a predetermined period of time.

7. The method according to claim 6, wherein the predetermined period of time is selected according to the depression of at least one key during the unusual sequence of key depressions.

8. The method according to claim 7, wherein said output device is a printer mechanism.

9. The method according to claim 8, wherein said printer mechanism is a thermal printer.

10. An electronic apparatus responsive to a plurality of input signals and having an output device, said apparatus comprising:

(a) a memory;

(b) means responsive to selected ones of said input signals for storing a selected multi-digit alphanumeric code in said memory;

(c) means responsive to said selected ones of said input signals for repetitively generating a control signal independently of subsequent input signals; and (d) means for transferring said code in said memory to said output device in response to said control signal.

11. The apparatus according to claim 10 wherein said output device is a thermal printing unit which prints out said code.

12. The apparatus according to claim 11 wherein the electronic apparatus includes an electronic calculator having keyboard input means.

13. The apparatus according to claim 12 wherein said multi-digit alphanumeric code represents, when printed, a plurality of numeral eights.

14. The apparatus according to claim 12 wherein said means for generating a control signal is responsive to means for delaying a predetermined period of time between the generation of individual control signals by said generating means, whereby the alphanumeric code is repetitively printed by said printer with a predetermined period of time occurring between printing operations.

15. The apparatus according to claim 12 wherein said thermal printing unit prints a line of alphanumeric characters in response to the multi-digit alphanumeric code stored in said memory.

16. The electronic apparatus according to claim 15 wherein said generating means is responsive to delay means for delaying by a preselected period the lines of alphanumeric characters printed at said thermal printing unit.

17. The electronic apparatus according to claim 16 wherein said means responsive to said selected ones of said input signals is responsive to input signals generated by means of an unusual sequence of key depressions at said keyboard input means, said unusual sequence being a sequence which would not be encountered during the normal operation of said apparatus.

18. The apparatus according to claim 17 wherein said delay means is responsive to the depression of one or more numeral keys during said unusual sequence of key depressions, whereby the period of the delay is a function of the particular one or more numeral keys depressed.

* * * * *